US009317329B2

United States Patent
Tejaswini et al.

(10) Patent No.: US 9,317,329 B2
(45) Date of Patent: Apr. 19, 2016

(54) ARBITRATING RESOURCE ACQUISITION FOR APPLICATIONS OF A MULTI-PROCESSOR MOBILE COMMUNICATIONS DEVICE

(75) Inventors: Fnu Tejaswini, San Diego, CA (US); Vaibhav Mathur, San Diego, CA (US); Sachin A. Abhyankar, San Diego, CA (US); Ali Navrozally, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 13/295,820

(22) Filed: Nov. 14, 2011

(65) Prior Publication Data

US 2012/0263125 A1 Oct. 18, 2012

Related U.S. Application Data

(60) Provisional application No. 61/413,780, filed on Nov. 15, 2010.

(51) Int. Cl.
*G06F 9/46* (2006.01)
*G06F 9/50* (2006.01)

(52) U.S. Cl.
CPC ............ *G06F 9/5011* (2013.01); *G06F 9/5038* (2013.01); *G06F 9/5077* (2013.01); *G06F 2209/5021* (2013.01)

(58) Field of Classification Search
CPC ... G06F 9/5077; G06F 9/5038; G06F 9/4812; G06F 9/3009; G06F 1/3203; G06F 11/1004; G06F 9/5011; G06F 2209/5021
See application file for complete search history.

(56) References Cited

U.S. PATENT DOCUMENTS 5,339,427 A * 8/1994 Elko et al. ............... 718/103
5,805,900 A * 9/1998 Fagen et al. ............. 710/220

(Continued)

FOREIGN PATENT DOCUMENTS

CN 1577281 A 2/2005
CN 1959644 A 5/2007

(Continued)

OTHER PUBLICATIONS

International Search Report and Written Opinion—PCT/US2011/060841—ISA/EPO—Mar. 26, 2012.

*Primary Examiner* — Lewis A Bullock, Jr.
*Assistant Examiner* — Jacob Dascomb
(74) *Attorney, Agent, or Firm* — Raphael Freiwirth; Satheesh Karra

(57) ABSTRACT

In an embodiment, a multi-processor mobile communications device includes a first processor system executing a concurrency manager server application (CMSA) and a second processor system executing a concurrency manager client application (CMCA). The CMSA determines priority levels related to access to resources for a first set of applications that are configured for execution on the first processor system and a second set of applications that are configured for execution on the second processor system. The CMSA notifies the CMCA of the determined priorities. The CMSA and the CMCA each then selectively grant or reject access to the resources for the first and second sets of applications, respectively, based on the determined priorities levels. In another embodiment, if the CMSA or CMCA rejects an application's request to access resources, the CMSA or CMCA can determine availability of alternative resources by which the requesting application can achieve its goal.

26 Claims, 18 Drawing Sheets

(56) References Cited

U.S. PATENT DOCUMENTS

| | | |
|---|---|---|
| 6,779,182 B1 | 8/2004 | Zolnowsky |
| 6,823,472 B1 | 11/2004 | DeKoning et al. |
| 7,047,299 B1 * | 5/2006 | Curtis ........................ 709/225 |
| 7,137,119 B1 | 11/2006 | Sankaranarayan et al. |
| 7,228,351 B2 * | 6/2007 | Arwe ........................ 709/226 |
| 7,689,998 B1 * | 3/2010 | Chrysanthakopoulos .... 718/104 |
| 7,693,053 B2 | 4/2010 | Terakawa |
| 8,533,716 B2 * | 9/2013 | Lippett ........................ 718/100 |
| 2003/0009558 A1 | 1/2003 | Ben-Yehezkel |
| 2005/0246707 A1 | 11/2005 | Ismail et al. |
| 2006/0020944 A1 * | 1/2006 | King et al. ................. 718/104 |
| 2007/0101333 A1 | 5/2007 | Mewhinney et al. |
| 2009/0006693 A1 | 1/2009 | Dunn et al. |
| 2009/0006695 A1 | 1/2009 | Bushell et al. |
| 2009/0119773 A1 * | 5/2009 | D'Amore et al. ............. 726/21 |
| 2009/0144509 A1 | 6/2009 | Wong et al. |
| 2009/0276783 A1 * | 11/2009 | Johnson et al. ............. 718/104 |
| 2010/0262973 A1 | 10/2010 | Ernst et al. |
| 2010/0280995 A1 * | 11/2010 | Munegowda et al. ........ 707/648 |
| 2011/0022712 A1 | 1/2011 | Numaoka et al. |
| 2011/0072292 A1 * | 3/2011 | Khawand et al. ............. 713/340 |
| 2011/0107344 A1 | 5/2011 | Kim et al. |
| 2011/0257983 A1 * | 10/2011 | Rathonyi et al. ............. 704/503 |

FOREIGN PATENT DOCUMENTS

| | | |
|---|---|---|
| EP | 0964332 A1 | 12/1999 |
| JP | H10134010 A | 5/1998 |
| JP | 2007108944 A | 4/2007 |
| JP | 2009230466 A | 10/2009 |
| JP | 2010039582 A | 2/2010 |

\* cited by examiner

Performed at Concurrency Manager (Client or Server)

ARBITRATING RESOURCE ACQUISITION FOR APPLICATIONS OF A MULTI-PROCESSOR MOBILE COMMUNICATIONS DEVICE

CLAIM OF PRIORITY UNDER 35 U.S.C. §119

The present Application for Patent claims priority to Provisional Application No. 61/413,780 entitled "ARBITRATING RESOURCE ACQUISITION FOR APPLICATIONS OF A MULTI-PROCESSOR MOBILE COMMUNICATIONS DEVICE", filed Nov. 15, 2010, and assigned to the assignee hereof and hereby expressly incorporated by reference herein.

BACKGROUND

1. Field of the Invention

Embodiments of the invention relate to arbitrating resource acquisition for applications of a mobile communications device.

2. Relevant Background

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal FDMA (OFDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interacts with UEs through an over the air interface and with the RAN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as W-CDMA, CDMA, FDMA, TDMA, GSM, etc. In a dispatch model, communication between endpoints (e.g., UEs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

SUMMARY

In an embodiment, a multi-processor mobile communications device includes a first processor system executing a concurrency manager server application (CMSA) and a second processor system executing a concurrency manager client application (CMCA). The CMSA determines priority levels related to access to resources for a first set of applications that are configured for execution on the first processor system and a second set of applications that are configured for execution on the second processor system. The CMSA notifies the CMCA of the determined priorities. The CMSA and the CMCA each then selectively grant or reject access to the resources for the first and second sets of applications, respectively, based on the determined priorities levels. In another embodiment, if the CMSA or CMCA rejects an application's request to access resources, the CMSA or CMCA can determine availability of alternative resources by which the requesting application can achieve its goal.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
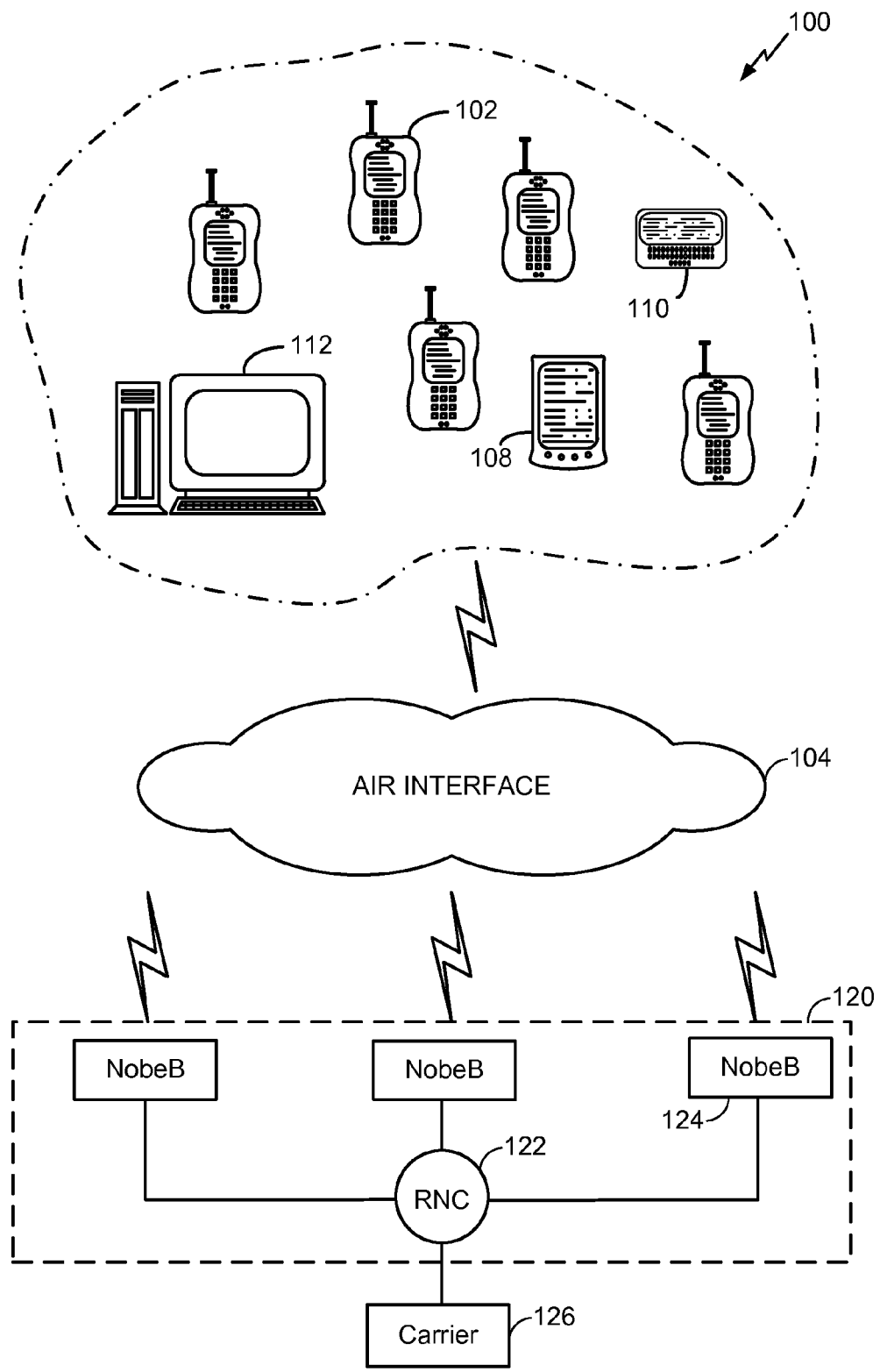
FIG. 1 is a diagram of a wireless network architecture that supports user equipments and radio access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple UEs.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
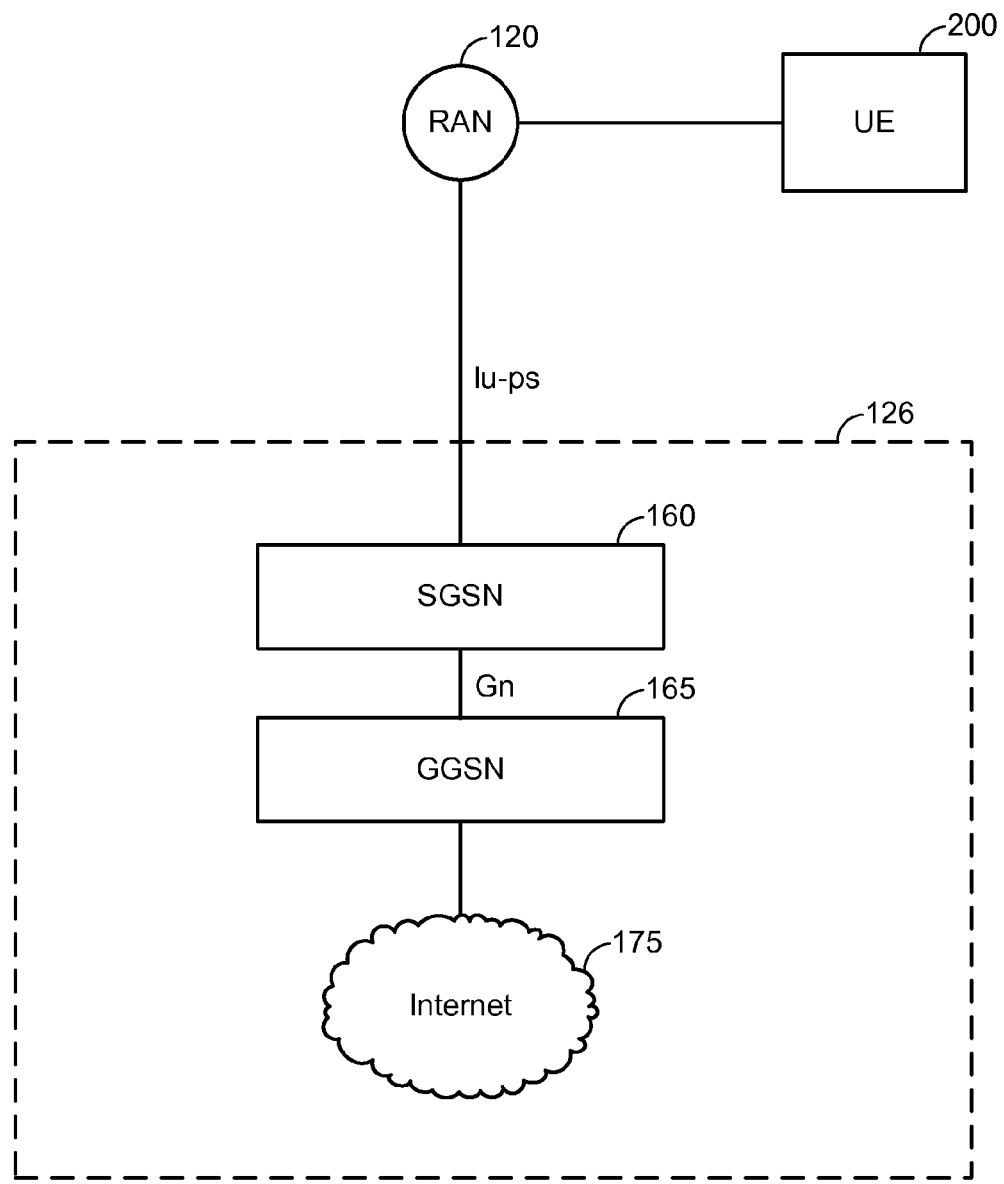
FIG. 2A illustrates the core network of FIG. 1 according to an embodiment of the present invention.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., access terminals) of a GSM or W-CDMA network to move from place to place while continuing to connect to the internet as if from one location at the GGSN 165. This is achieved transferring the subscriber's data from the subscriber's current SSGN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Iu interface, with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2B:
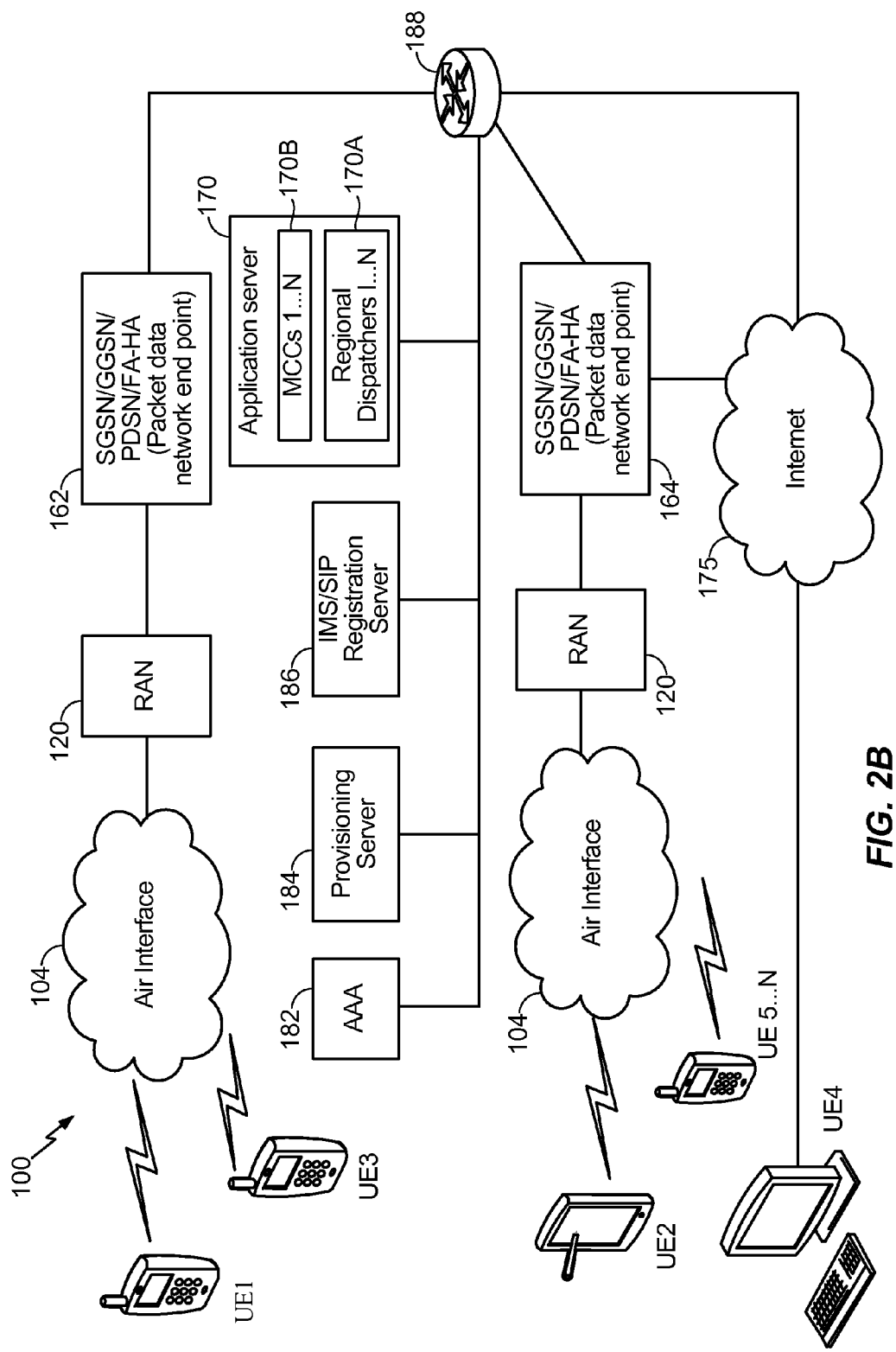
FIG. 2B illustrates an example of the wireless communications system of FIG. 1 in more detail.

FIG. 2B illustrates an example of the wireless communications system 100 of FIG. 1 in more detail. In particular, referring to FIG. 2B, UEs 1 . . . N are shown as connecting to the RAN 120 at locations serviced by different packet data network end-points. The illustration of FIG. 2B is specific to W-CDMA systems and terminology, although it will be appreciated how FIG. 2B could be modified to confirm with a 1xEV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2B, UEs 1, 3 and 5 . . . N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2B are not intended to limit the types of UEs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which in at least one embodiment can correspond to a distributed network of servers that collectively functions to arbitrate communication sessions (e.g., half-duplex/full-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
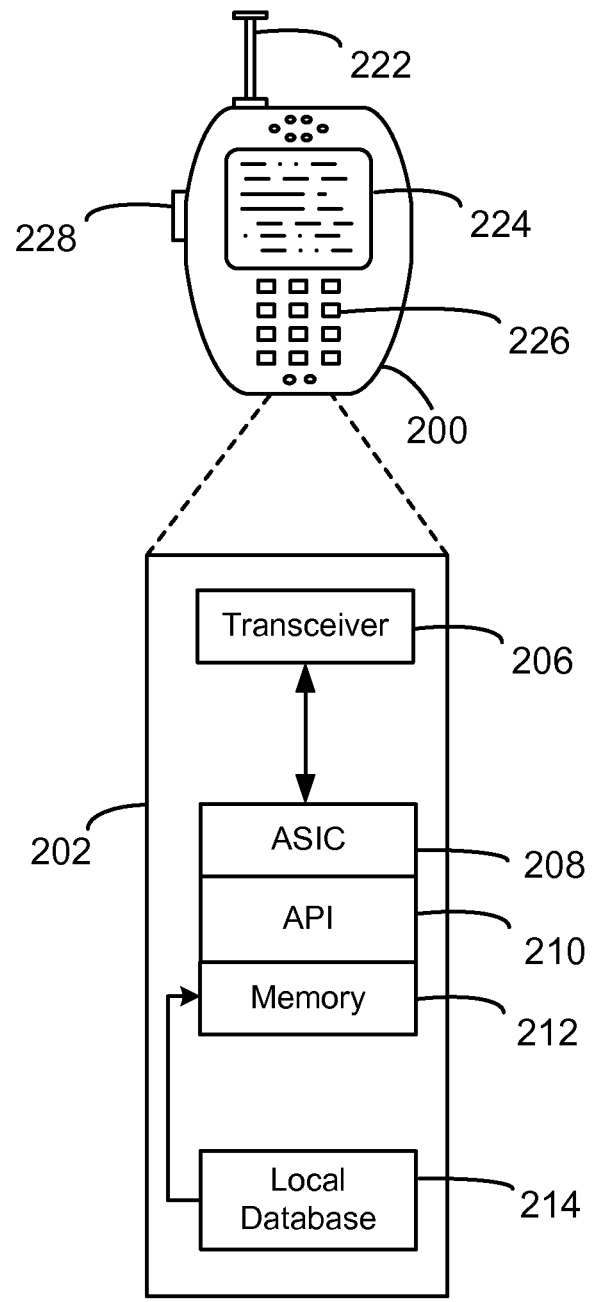
FIG. 3 is an illustration of user equipment in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit (ASIC), or other processor, microprocessor, logic circuit, or other data processing device. The one or more processors (e.g., 207, 208) execute the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, Processor 1207, Processor II 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

Further, UE 200 is shown as including a plurality of subscriber identity modules (SIMs) 1 . . . N, 244. Thus, UE 200 corresponds to a multi-SIM UE, as will be described in more detail below.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Below, embodiments of the invention are generally described in accordance with W-CDMA protocols and associated terminology (e.g., such as UE instead of mobile station (MS), mobile unit (MU), access terminal (AT), etc., RNC, contrasted with BSC in EV-DO, or Node B, contrasted with BS or MPT/BS in EV-DO, etc.). However, it will be readily appreciated by one of ordinary skill in the art how the embodiments of the invention can be applied in conjunction with wireless communication protocols other than W-CDMA (e.g., EV-DO, Long-Term Evolution (LTE), etc.).

On multi-processor handsets, most applications run on an application processor system on top of a High Level Operating Systems (HLOS) (e.g., Android, iOS, Windows Mobile, etc.). These applications are usually not particularly latency sensitive and are not closely tied to the air interface. However, for latency sensitive applications such as VoIP applications, the HLOS may be insufficient to support latency sensitive functionality, such as Quality of Service (QoS). Accordingly, latency sensitive applications can be handled by a modem processor system, which is separate from the application processor system, so that the latency sensitive applications can have more direct access to the air interface.

However, when different applications are running concurrently on the modem and application processor systems, problems can arise with respect to resource contention between the processor systems, whereby the resource cannot be assigned to more than a threshold number of applications (e.g., one) at a given time. For example, in terms of the audio output device or speakers of the handset, typical concurrency management solutions implemented by the HLOS block all other applications from access to the audio output device when a voice call is active, but otherwise do not enforce restrictions upon the applications on the modem and processor systems. Thus, it is possible that a first application (e.g., a VoIP application) on the modem processor system can attempt to access the audio output device at the same time as a second application (e.g., an MP3 application) on the application processor system, resulting in merged audio output that degrades the user experience. Additionally, the priorities for other applications may not be supported.

Figure 4A:
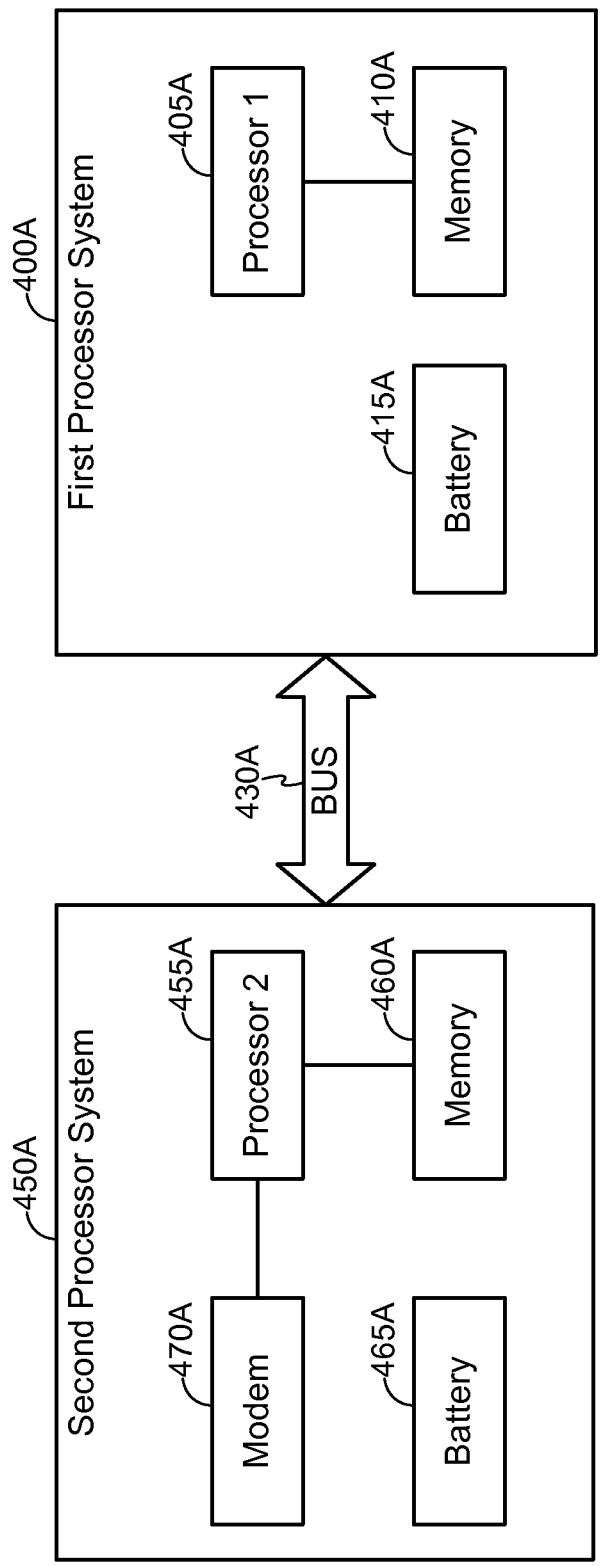
FIGS. 4A and 4B are illustrations of multi-processor systems in accordance with embodiments of the invention.

FIG. 4A illustrates structural architecture of a multi-processor UE in accordance with an embodiment of the present invention. Referring to FIG. 4A, the multi-processor UE includes a first processor system 400A and a second processor system 450A. In an example, the first processor system 400A corresponds to an application processor system that is responsible for execution of a majority of applications that are executed by the multi-processor UE, and the second processor system 450A corresponds to a modem processor system that controls wireless communication functions of the multi-processor UE and can be configured to execute a subset of latency sensitive applications (e.g., such as VoIP applications).

Referring to FIG. 4A, the first processor system 400A includes a first processor 405A, a memory 410A and a battery 415A, and the second processor system 450A includes a second processor 455A, a memory 460A, a battery 465A and a modem 470A. In an example, the batteries 415A and 465A can either be implemented as separate batteries that provide power to the first and second processor systems 400A and 450A, respectively, or alternatively as a single battery that provides power to both processor systems. Also shown is bus 430A, which connects the first and second processor systems 400A and 450A and through which hardware and/or software components of the respective processor systems can communicate with each other.

Figure 4B:
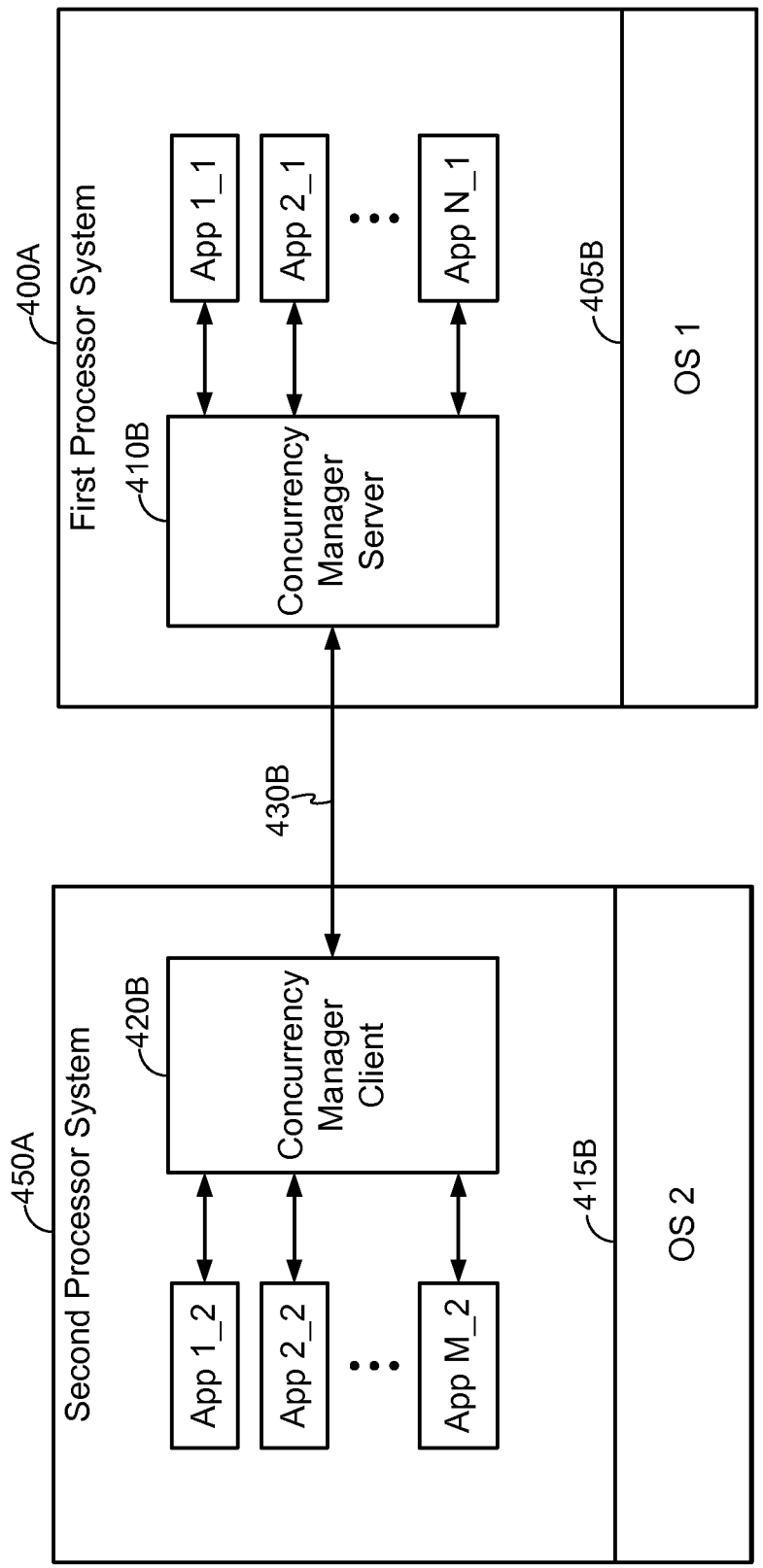

FIG. 4B illustrates an interaction between software modules of the first and second processor systems 400A and 450A of FIG. 4A in accordance with an embodiment of the present invention. Referring to FIG. 4B, the first processor system 400A includes a plurality of client-executable applications 1_1 ... N_1, where N>=1. The execution of client-executable applications 1_1 ... N_1 is controlled by a first operating system (OS), 405B. In an example, the first OS 405B can correspond to a HLOS, such as Android, iOS, Windows Mobile, etc.

Each of the client-executable applications 1_1 ... N_1 are configured to interact with a concurrency manager server 410B. The concurrency manager server 410B is responsible for determining the priorities of applications for accessing one or more resources of the multi-processor UE. In particular, the concurrency manager server 410B determines the resource-access priorities for applications associated with each processor of the multi-processor UE (e.g., modem processor system applications, application processor system applications, etc.). In an embodiment, the concurrency manager server 410B tracks semaphores associated with the multi-processor UE's resources while permitting a locked resource used by a lower-priority application to be unlocked in response to a higher-priority application's request for the locked resource. Alternatively, the concurrency manager server 410B does not need to track external semaphores and instead can implement a passive or implied resource availability status, whereby the concurrency manager server 410B simply monitors which resources are currently available and which resources are being used and are thereby unavailable. In either case, the concurrency manager server 410B is equipped to determine out which resources are available or unavailable and further to determine whether an application requesting access to an unavailable resource has sufficient privileges to preempt a current application's use of that resource.

Referring to FIG. 4B, the second processor system 450A includes a plurality of client-executable applications 1_2 ... M_2, where M>=1. The execution of client-executable applications 1_2 ... M_2 is controlled by a second operating system (OS), 415B. In an example, the second OS 415B can correspond to a Real-Time Operating System (RTOS). Each of the client-executable applications 1_2 ... M_2 are configured to interact with a concurrency manager client 420B. The concurrency manager client 420B is a proxy for the concurrency manager server 410B of the first processor system 400A. The concurrency manager client 420B and the concurrency manager server 410B communicate with each other over a connection 430B, which can be implemented via the bus 430A shown in FIG. 4A as an example. Similar to the concurrency manager server 410B, in an embodiment, the concurrency manager client 420B tracks semaphores associated with the multi-processor UE's resources while permitting a locked resource used by a lower-priority application to be unlocked in response to a higher-priority application's request for the locked resource. Alternatively, the concurrency manager client 420B does not need to track external semaphores and instead can implement a passive or implied resource availability status, whereby the concurrency manager client 420B simply monitors which resources are currently available and which resources are being used and are thereby unavailable. In either case, the concurrency manager client 420B is equipped to determine out which resources are available or unavailable and further to determine whether an application requesting access to an unavailable resource has sufficient privileges to preempt a current application's use of that resource.

While not shown in FIG. 4A or 4B, it is possible that the multi-processor UE include one or more additional processors associated one or more additional processor systems. In this case, each of the additional processor systems can include a processor, memory, one or more applications as well as their own instance of the concurrency manager client 420B. Accordingly, the concurrency manager server 410B can potentially interact with multiple concurrency manager clients (e.g., 420B) across multiple processor systems.

As will be explained in more detail below, the concurrency manager server 410B monitors and determines priorities for one or more resources of the multi-processor UE, including but not limited to a display output device (e.g., a screen of the multi-processor UE), an audio output device (e.g., speakers and/or a microphone output of the multi-processor UE), a modem or antenna, a vibration output device, battery power, etc. The concurrency manager server 410B can collect information regarding the one or more monitored resources via communication with the first and/or second OS's 415B and 405B, from the client-executable applications 1_1 ... N_1 directly or from the client-executable applications 1_2 ... M_2 of the second processor system 450A via the concurrency manager client 420B. For example, the concurrency manager client 420B can send notifications regarding actual or desired resource-access of applications 1_2 ... M_2 to the concurrency manager server 410B. The concurrency manager server 410B can use its monitored resource-access information to determine recommended priorities by which the applications 1_1 . . . N_1 and 1_2 . . . M_2 should access the associated resource. The concurrency manager server 410B may maintain a master list of each of applications 1_1 . . . N_1 as well as 1_2 . . . M_2, as well as their associated priorities. By notifying one or more concurrency manager clients (e.g., 420B) of the determined priorities, the applications 1_1 . . . N_1 and 1_2 . . . M_2 (via the concurrent manager server application 410B and the concurrency manager client application 420B, respectively) can determine whether to attempt access of the resource instead of simply acquiring the resource indiscriminately. Example implementations of application priority determination and notification are described below with respect to FIGS. 5A through 8.

Figure 5A:
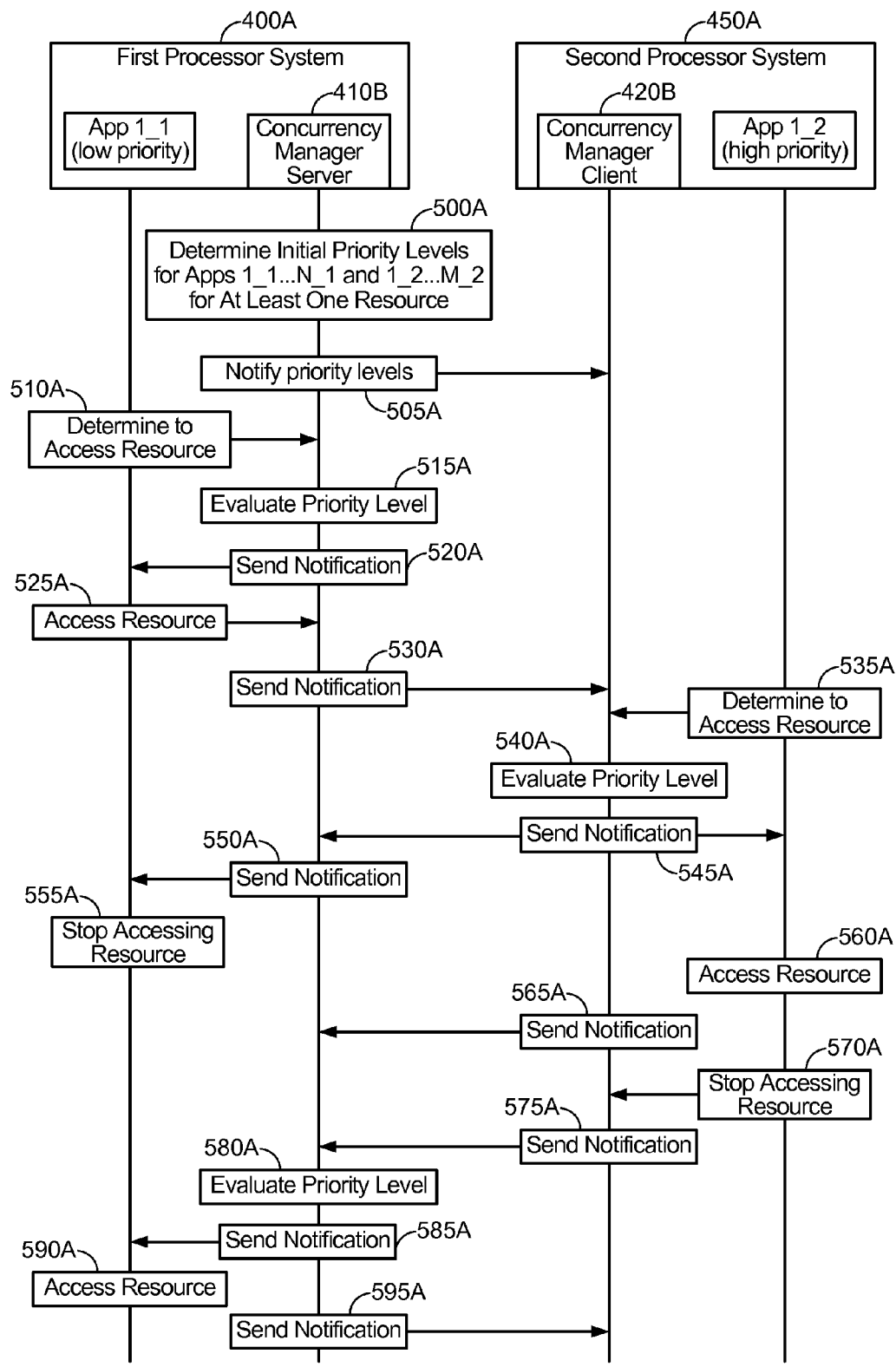
FIGS. 5A-5D are illustrations of various scenarios of resource allocation in accordance with embodiments of the invention.

FIG. 5A illustrates an example in which the concurrency manager server application 410B arbitrates access to a given resource when a low-priority application 1_1 accesses a resource and a high-priority application 1_2 later determines to access the same resource in accordance with an embodiment of the invention. In particular, FIG. 5A illustrates an example in which the low-priority application is accessing the at least one resource when the high-priority application desires access to the same resource. However, it will be appreciated that embodiments of the invention are not limited to the division of applications between processors as illustrated (e.g., higher priority applications on a first processor and lower priority applications on a second processor). In alternative embodiments, there may be a mix of higher and lower priority applications on one or both processors. Further, the embodiments are not limited to only two processors, as more processors may be present. Additionally, once the priorities of applications are determined in 500A, the new priorities can be communicated to all instances of the concurrency management clients/server. Also, in some embodiments, the various applications may not be informed of their priorities (e.g., the concurrency manager client/server application may manage the priorities on behalf of their respective applications).

In FIG. 5A, the concurrency manager server 410B determines, for at least one resource, initial priority levels for one or more of applications 1_1 . . . N_1 of the first processor system 400A and applications 1_2 . . . M_2 of the second processor system 450A, 500A. For example, in 500A, the concurrency manager server 410B can load default priority levels for applications with respect to the at least one resource. For example, if the at least one resource corresponds to access to an audio output device, application 1_1 corresponds to an MP3-player application and application 1_2 corresponds to a VoIP application, then the initial priority level for the VoIP application may be higher than the initial priority level for the MP3-player application. One embodiment of the priority determination of 500A is described in more detail below with respect to FIG. 9.

While not shown in FIG. 5A, the applications whose priorities are determined in 500A may correspond to applications that have registered with the concurrency manager server 410B (e.g., directly or via the concurrency manager clients) as being associated with the at least one resource. In the case of the audio output device, it will be appreciated that applications that are unrelated to audio playback need not register with the concurrency manager server 410B (at least, not for the resource of the audio output device).

For convenience of explanation, in FIG. 5A, assume that applications 1_1 and 1_2 are registered with the concurrency manager server 410B for the at least one resource. Thus, in 500A, the concurrency manager server 410B determines the relative priorities of applications 1_1 and 1_2 for the at least one resource. After the initial priority determination of 500A, the concurrency manager server 410B sends a notification to concurrency manager client 420B (and any other concurrency manager clients) of the relative priorities and optionally an indication that the resource is available, 505A.

At some later point in time, assume that application 1_1 determines to access the at least one resource, 510A. For example, if application 1_1 corresponds to an MP3-player application, a user of the multi-processor UE may have requested to play a particular MP3 in 510A and informs the concurrency manager server 410B of the at least one resource to be used. Next, the concurrency manager server 410B evaluates the priority levels, 515A, associated with the at least one resource as indicated in 510A to determine whether any application of equal or higher priority than application 1_1 is already accessing the at least one resource. In this case, it is assumed that the at least one resource is not being accessed at this point, such that concurrency manager server 410B determines that it is permissible to access the at least one resource in 515A.

The concurrency manager server 410B notifies application 1_1 in 520A that it has priority to access the resource. It will be appreciated that the concurrency manager server 410B can also notify the concurrency manager client 420B at this time of the resource request/grant for application 1_1. Accordingly, after receiving approval from concurrency manager server 410B, application 1_1 begins to access the at least one resource in 525A. The concurrency manager server 410B updates its records to reflect that application 1_1 is accessing the at least one resource, and then sends a notification to concurrency manager client 420B to inform concurrency manager client 420B that the at least one resource is being accessed by application 1_1, in 530A.

At some later point in time, assume that application 1_2 determines to access the at least one resource that is already being accessed by application 1_1, 535A. For example, if application 1_2 corresponds to a VoIP application, 535A can include a VoIP call announcement message arriving at the multi-processor UE. Next, concurrency manager client 420B evaluates whether application 1_2 can access the at least one resource by evaluating the priority levels of applications in association with the at least one resource, 540A. For example, in 540A, concurrency manager client 420B can determine whether any applications with a priority greater than or equal to the priority of application 1_2 are currently accessing the at least one resource, and if not, concurrency manager client 420B determines the resource can be accessed. In the embodiment of FIG. 5A, it is assumed that application 1_2 has a higher priority than application 1_1, such that concurrency manager client 420B determines that it is permissible for application 1_2 to access the at least one resource in 540A. Accordingly, concurrency manager client 420B sends a notification to the concurrency manager server 410B to report the resource request, 545A. As illustrated, in 545A both application 1_2 and concurrency manager server 410B are notified of the results of the evaluation (540A) that indicates application 1_2 has priority for the at least one resource. However, it will be appreciated that in alternative embodiments, the notification could go to the concurrency manager server 410B first for confirmation and notifying conflicted application 1_1 that it needs to release the at least one resource. The concurrency manager server 410B can then notify the conflicting device and confirm availability back to the concurrency manager client 420B, which then can notify application 1_2 of the availability of the resource (see, e.g., FIG. 6). However, as illustrated the notification 545A can be sent concurrently to the concurrency manager server 410B and application 1_2, which will be described in the following.

After the notification 545A, application 1_2 can access the at least one resource in 560A, and sends a notification to the concurrency manager client 420B to report the resource access, 565A. Concurrently, notification 545A is received at the concurrency manager server 410B, which in turn sends a notification 550A to application 1_1 to release the at least one resource. Optionally, concurrency manager server 410B can perform a separate evaluation to confirm the decision in 540A, prior to sending the notification 550A. Upon receipt of 550A, application 1_1 stops accessing the at least one resource in 555A. In this scenario, there is no need to send a notification back to the concurrency manager client 420B, as the decision to grant the at least one resource to the higher priority application was already made and conveyed in 540A and 545A. In the alternative scenario described above, where the notification was delayed to application 1_2, after the release in 555A, the concurrency manager server 410B could send the notification to confirm availability back to the concurrency manager client 420B and also notify any additional clients. Regardless of the optional notification paths, the concurrency manager server 410B can updates its records to reflect that application 1_2 is accessing the at least one resource and distribute that information to any remaining clients.

At some later point in time, assume that application 1_2 stops accessing the at least one resource, 570A. For example, if application 1_2 corresponds to a VoIP application, 570A may correspond to termination of the VoIP communication session or call. Application 1_2 sends a notification to the concurrency manager server 410B to report the cessation of application 1_2's resource access, 575A. The concurrency manager server 410B updates its records to reflect that application 1_2 is no longer accessing the at least one resource and updates any concurrency manager clients. If there are still applications that are requesting access to the at least one resource released, the priority of the one or more applications can be evaluated. For example, if application 1_1 is still awaiting access to the at least one resource, an evaluation of the priority level, 580A, of that application can be performed. After the evaluation, notification, 585A, can be sent to application 1_1 to inform application 1_1 that the at least one resource is now available. As will be appreciated, the concurrency manager server 410B sends the notification of 585A to application 1_1 so that application 1_1 can (in its discretion) start a new access or resume its previous access of the at least one resource, 590A.

For example, if the at least one resource corresponds to an audio output device and application 1_1 corresponds to an MP3-player application, 590A can include resuming audio playback of a song that was 'paused' when the MP3-player application stopped its access to the audio output device in 555A. Application 1_1 sends a notification to the concurrency manager server 410B to report the resumption of application 1_1's resource access, 590A, and the concurrency manager server 410B updates its records to reflect that application 1_1 is accessing the at least one resource, and then sends a notification to concurrency manager client 420B and any other clients that the at least one resource is being accessed by application 1_1, in 595A.

Figure 5B:
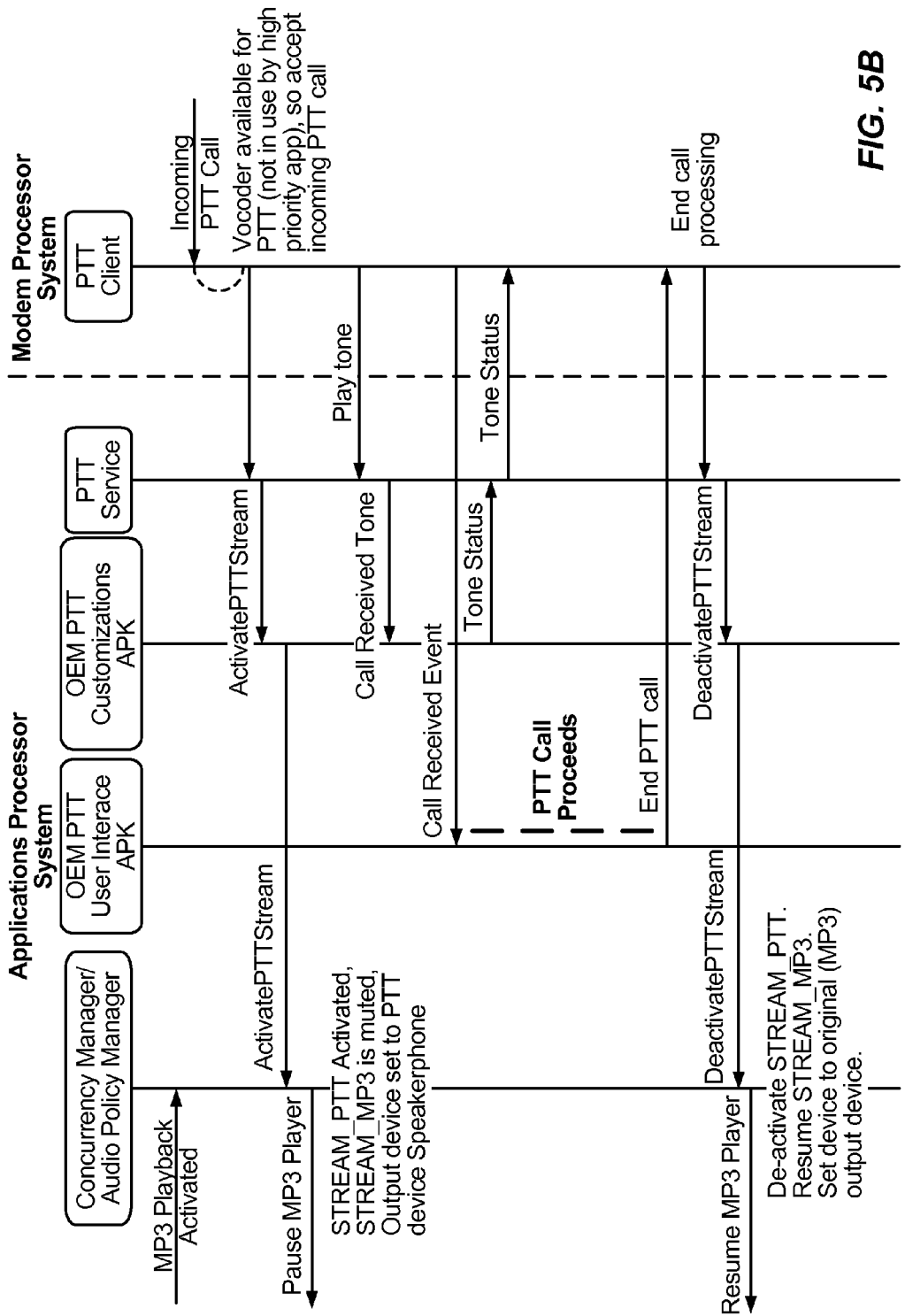

FIG. 5B illustrates a more specific implementation example of FIG. 5A whereby application 1_1 corresponds to an MP3-player application, application 1_2 corresponds to a PTT application/call and the at least one resource corresponds to the audio output device of the multi-processor UE in accordance with an embodiment of the invention. In particular, FIG. 5B illustrates an example whereby the MP3-player application is accessing the audio output device when the PTT application desires access to the same audio output device.

Referring to FIG. 5B, a low-priority MP3 application executing on an application processor system begins to play an MP3 music file (e.g., similar to 525A of FIG. 5A). In an example, the application processor system corresponds to the first processor system 400A and the MP3 application corresponds to application 1_1. During MP3 playback, a PTT client on a modem processor system receives an indication of an incoming PTT call (e.g., similar to 535A of FIG. 5A). In an example, the modem processor system corresponds to the second processor system 450A and the PTT client corresponding to application 1_2. After being notified of the PTT client's request for the audio resource, the concurrency manager server application on the application processor system pauses the MP3 player. Later, when the concurrency manager server application is subsequently notified that the PTT call is over, the concurrency manager server application notifies the MP3 application that MP3 playback can resume.

Figure 5C:
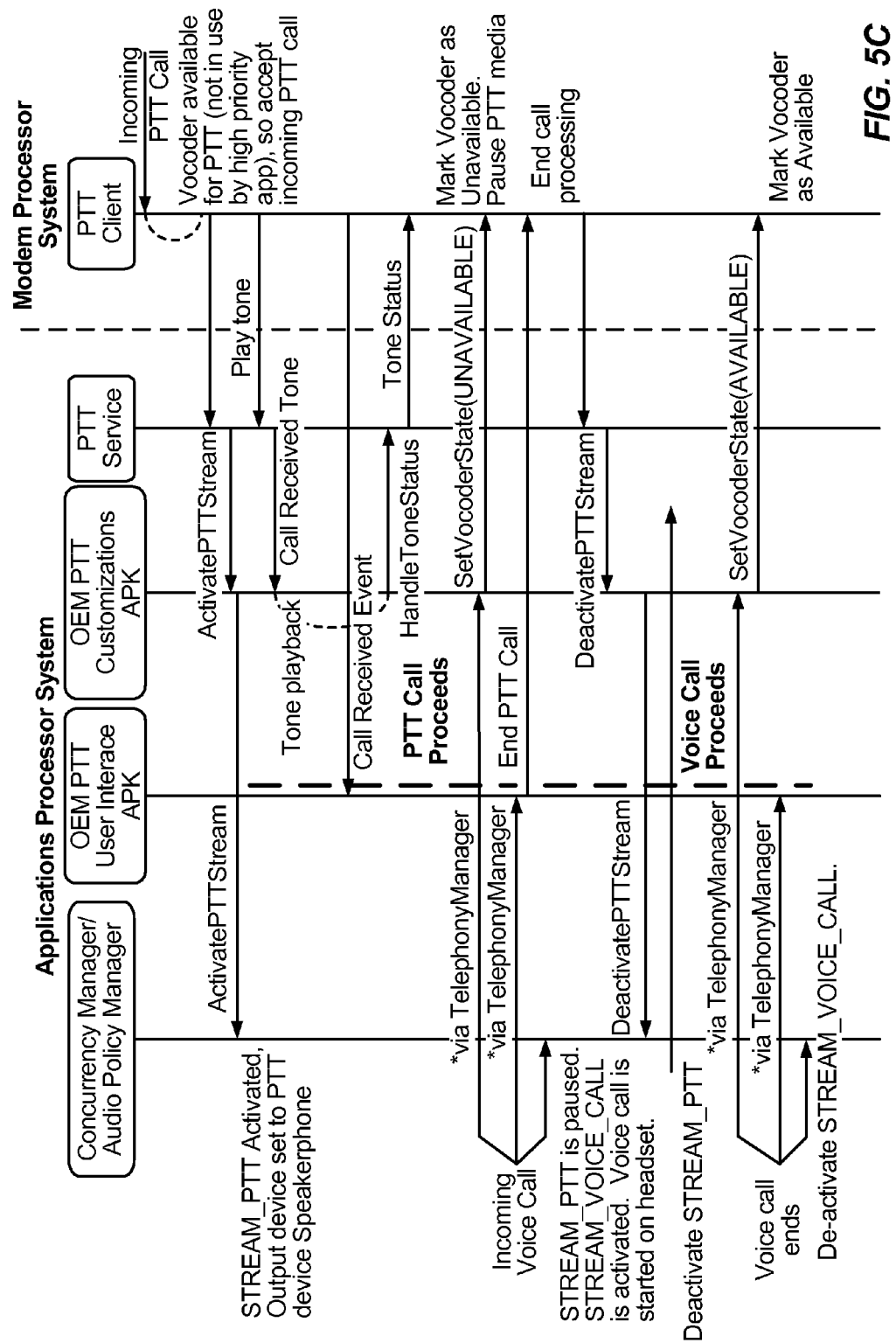

FIG. 5C illustrates a more specific implementation example based on FIG. 5A having an existing PTT application/call and the at least one resource corresponds to a vocoder device of the multi-processor UE in accordance with an embodiment of the invention. In particular, FIG. 5C illustrates an example whereby the PTT application/call is accessing the vocoder output device when a higher priority voice call desires access to the same vocoder device.

Figure 6:
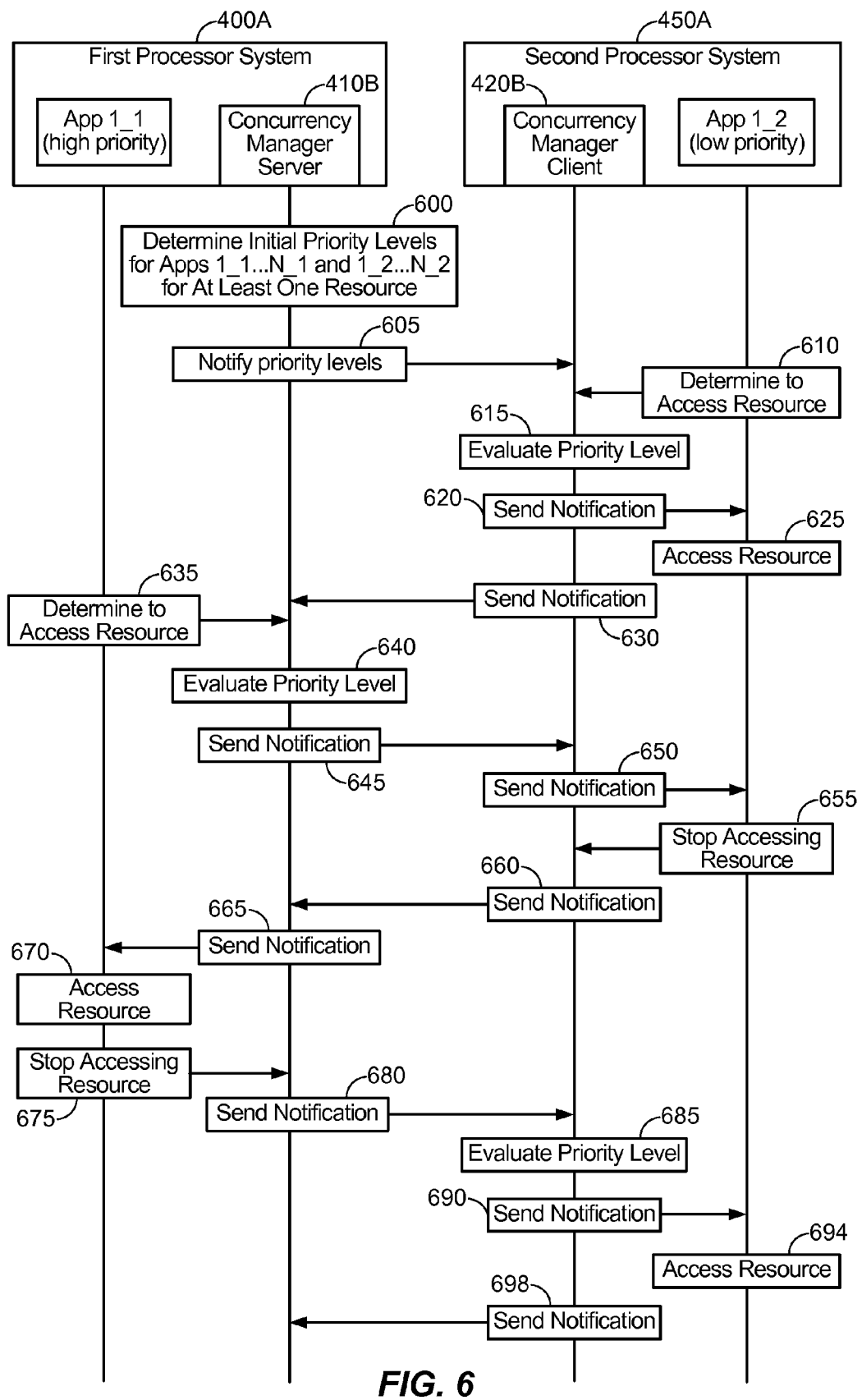
FIG. 6 is an illustration of at least one scenario of resource allocation in accordance with embodiments of the invention.

Referring to FIG. 5C, a low-priority PTT client executing on the modem processor system begins to play audio media in associated with a PTT call (e.g., similar to 525A of FIG. 5A, except the modem processor system executes the concurrency manager client application instead of the concurrency manager server application). In an example, the modem processor system corresponds to the second processor system 450A and the PTT client corresponds to application 1_2. During the PTT call, a circuit switched (CS) voice call application on the application processor system receives an indication of an incoming CS call. In an example, the application processor system corresponds to the first processor system 400A and the CS voice call application corresponds to application 1_1. After being notified of the PTT client's request for the audio resource, the concurrency manager client application on the modem processor system de-activates the PTT client, and the CS call begins. After the CS call, the PTT client is notified of the availability of the audio resource. FIG. 6, described below in more detail, is similar to FIG. 5C in the sense that a low-priority application's access to a resource is subsequently taken away and transferred to a higher-priority application.

Figure 5D:
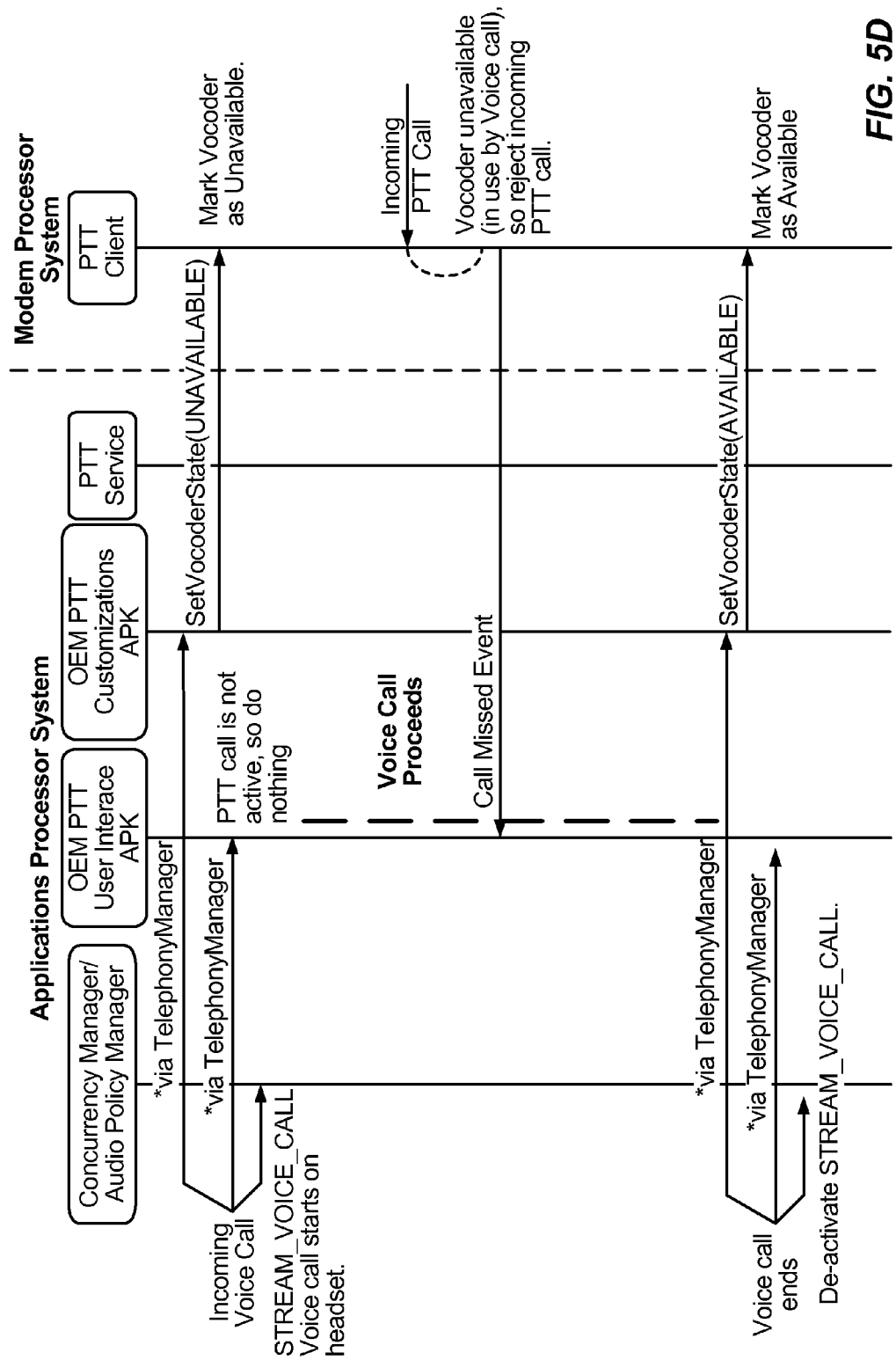

FIG. 5D illustrates a more specific implementation example based on FIG. 5D having an existing voice call and the at least one resource corresponds to a vocoder device of the multi-processor UE in accordance with an embodiment of the invention. In particular, FIG. 5D illustrates an example whereby the higher priority voice call is accessing the vocoder output device when the PTT application/call desires access to the same vocoder device.

Figure 7:
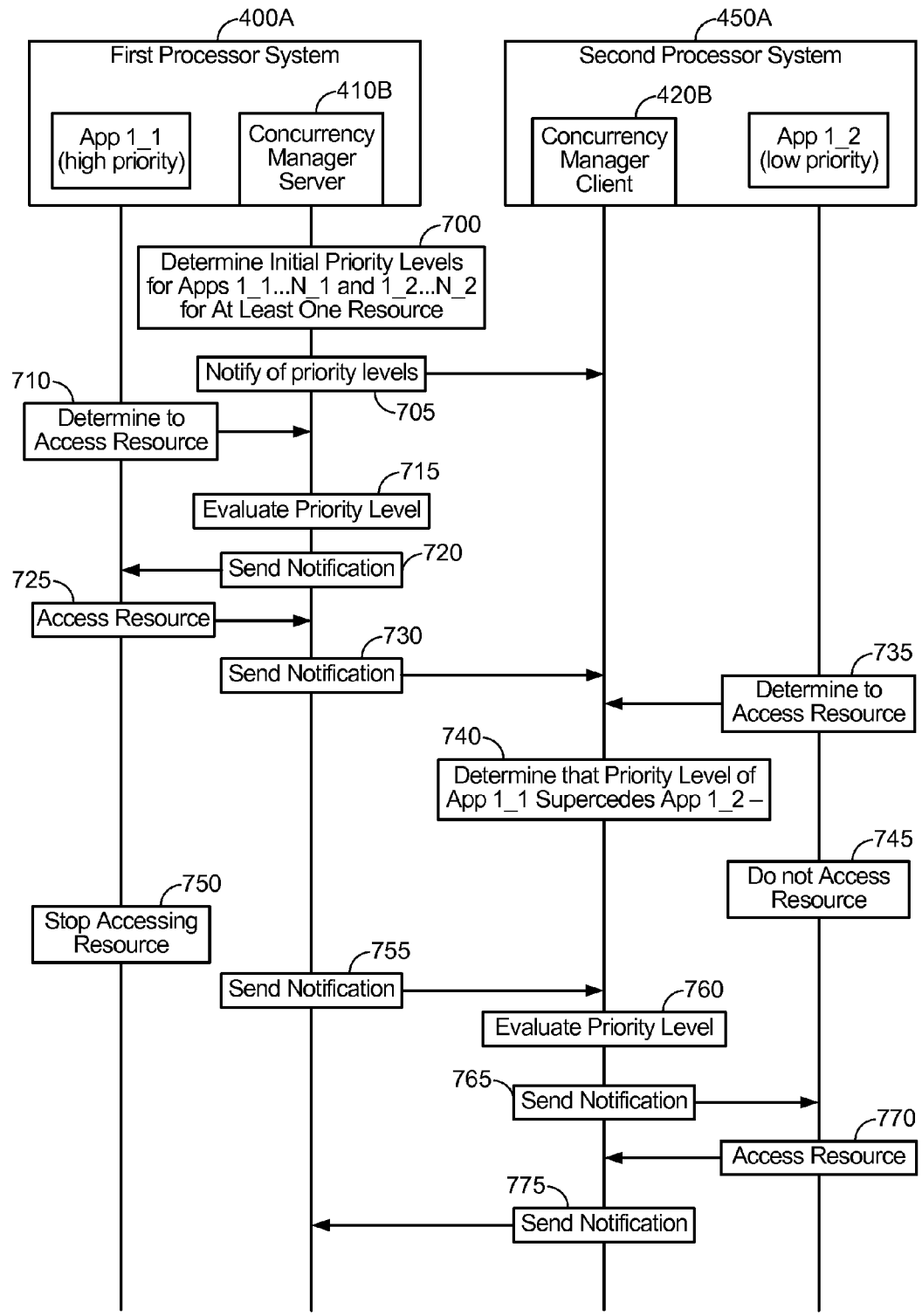
FIG. 7 is an illustration of at least one scenario of resource allocation in accordance with embodiments of the invention.
Figure 8:
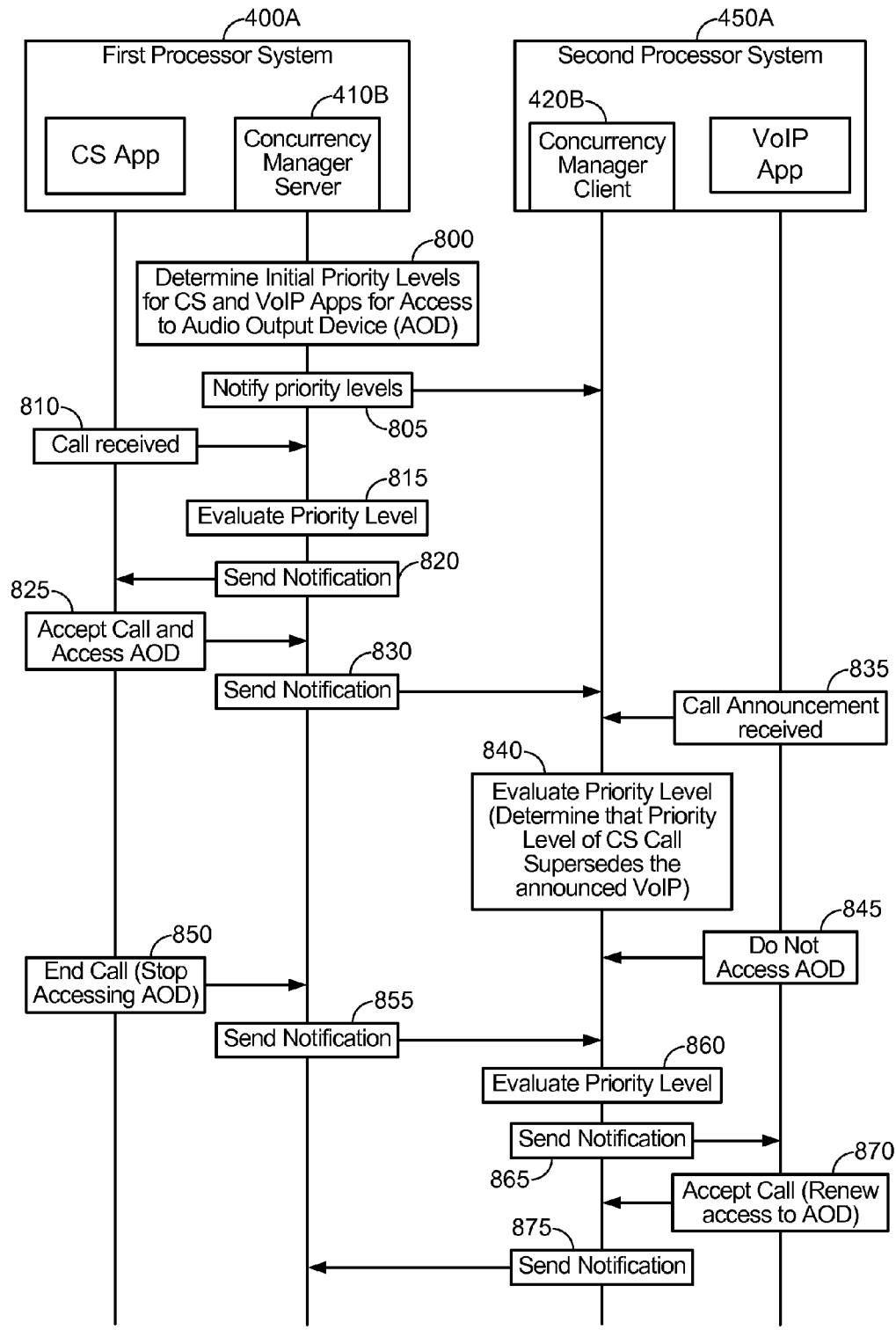
FIG. 8 is an illustration of at least one scenario of resource allocation in accordance with embodiments of the invention.

Referring to FIG. 5D, a high-priority circuit switched (CS) voice call application executing on the application processor system receives an incoming voice call notification, acquires the audio resource and then begins the voice call (e.g., similar to 525A of FIG. 5A, except the CS voice call application is a high-priority application). During the CS call, a PTT client on the modem processor system receives an indication of an incoming PTT call. After being notified of the PTT client's request for the audio resource, the concurrency manager client application on the modem processor system rejects the PTT client's audio resource request because the CS voice call application has a higher priority and is already using the audio resource. The PTT client is notified of the audio resource (or vocoder) availability after the CS voice call terminates and the audio resource is again available for acquisition. FIGS. 7-8, described below in more detail, are similar to FIG. 5D in the sense that a high-priority application's access to a resource is used to block a subsequent request to access the resource from a lower-priority application.

FIG. 6 illustrates an example whereby a concurrency manager server application arbitrates access to a given resource when a low-priority application 1_2 accesses a resource and a high-priority application 1_1 later determines to access the same resource in accordance with an embodiment of the invention. In particular, FIG. 6 illustrates an example whereby the low-priority application is accessing at least one resource when the high-priority application desires access to the same resource. Also, unlike FIG. 5A, in FIG. 6 the high-priority application is hosted by the first processor system 400A and the low-priority application is hosted by the second processor system 450A.

Referring to FIG. 6, similar to 500A of FIG. 5A, the concurrency manager server 410B determines, for at least one resource, initial priority levels for one or more of applications 1_1 ... N_1 of the first processor system 400A and applications 1_2 ... M_2 of the second processor system 450A, 600. After the initial priority determination of 600, the concurrency manager server 410B sends a notification to concurrency manager client 420B (and any other concurrency manager clients) of the relative priorities and optionally an indication that the resource is available, 605 (similar to 505A of FIG. 5A).

At some later point in time, assume that application 1_2 determines to access the at least one resource, 610. In this case, it is assumed that the at least one resource is not being accessed at this point, such that concurrency manager client 420B determines that it is permissible for application 1_2 to access the at least one resource in 615. The concurrency manager client 420B notifies application 1_2 that the at least one resource is available, 620, and application 1_2 begins to access the at least one resource, 625. The concurrency manager client 420B also notifies the concurrency manager server 410B that the at least one resource is being accessed by application 1_2, 630.

At some later point in time while the at least one resource is still being accessed by application 1_2, assume that application 1_1 (with a higher priority than application 1_2) determines to access the at least one resource, 635. The concurrency manager server 410B evaluates the priority level of application 1_1 and determines application 1_1 to have a higher priority than application 1_2, 640. The concurrency manager server 410B notifies the concurrency manager client 420B that application 1_1 is requesting access to the resource and to cease application 1_2's access to the at least one resource, 645. The concurrency manager client 420B receives the notification and instructs application 1_2 to stop accessing the at least one resource, 650. Application 1_2 releases the at least one resource, 655, and the concurrency manager client 420B notifies the concurrency manager server 410B that the at least one resource is now available, 660. The concurrency manager server 410B notifies application 1_1 that the at least one resource is now available, 665, and application 1_1 begins to access the at least one resource, 670.

Referring to FIG. 6, at some later point in time, application 1_1 stops accessing the at least one resource, 680, and the concurrency manager server 410B notifies the concurrency manager client 420B that the at least one resource is again available, 685. Because the at least one resource is determined to be available and is not being accessed by another application at 685, the concurrency manager client 420B notifies application 1_2 that the at least one resource is again available for access, 690. The application 1_2 thereby resumes access to the at least one resource, 694, and the concurrency manager client 420B notifies the concurrency manager server 410B that the at least one access is again being accessed by application 1_2.

FIG. 7 illustrates an example whereby a concurrency manager server application arbitrates access to a given resource when a high-priority application 1_1 accesses a resource and a low-priority application 1_2 later determines to access the same resource in accordance with an embodiment of the invention.

Referring to FIG. 7, similar to 500A of FIG. 5A, the concurrency manager server 410B determines, for at least one resource, initial priority levels for one or more of applications 1_1 ... N_1 of the first processor system 400A and applications 1_2 ... M_2 of the second processor system 450A, 700. After the initial priority determination of 700, the concurrency manager server 410B sends a notification to concurrency manager client 420B (and any other concurrency manager clients) of the relative priorities and optionally an indication that the resource is available, 705 (similar to 505A of FIG. 5A).

At some later point in time, assume that application 1_1 determines to access the at least one resource, 710. In this case, it is assumed that the at least one resource is not being accessed at this point, such that concurrency manager server 410 determines that it is permissible for application 1_1 to access the at least one resource in 715. The concurrency manager server 410B notifies application 1_1 that the at least one resource is available, 720, and application 1_1 begins to access the at least one resource, 725. The concurrency manager server 410B also notifies the concurrency manager client 420B that the at least one resource is being accessed by application 1_1, 730.

At some later point in time while the at least one resource is still being accessed by application 1_1, assume that application 1_2 (with a lower priority than application 1_1) determines to access the at least one resource, 735. The concurrency manager client 420B evaluates the priority level of application 1_2 and determines application 1_2 to have a lower priority than application 1_1, 740. Based on the determination from 740, the concurrency manager client 420B blocks application 1_2 from accessing the at least one resource, 745.

Referring to FIG. 7, at some later point in time after the resource request rejection at 740 and 745, application 1_1 stops accessing the at least one resource, 750. The concurrency manager server 410B notifies the concurrency manager client 420B that the at least one access is now available, 755. Because the at least one resource is determined to be available and is not being accessed by another application at 760, the concurrency manager client 420B notifies application 1_2 that the at least one resource is again available for access, 765. The application 1_2 thereby begins to access to the at least one resource, 770, and the concurrency manager client 420B notifies the concurrency manager server 410B that the at least one access is being accessed by application 1_2.

FIG. 8 illustrates a more specific implementation example of FIG. 7 whereby application 1_1 corresponds to a voice-call or circuit-switched (CS) application, application 1_2 corresponds to a VoIP application and the at least one resource corresponds to the audio output device of the multi-processor UE in accordance with an embodiment of the invention. In particular, FIG. 8 illustrates an example whereby the CS application is accessing the audio output device when the VoIP application desires access to the same audio output device. Aside from these distinctions, the general call-flow of FIG. 8 corresponds to FIG. 7. Accordingly, 800 through 875 of FIG. 8 correspond to 700 through 775 of FIG. 7 except as noted above.

Figure 9:
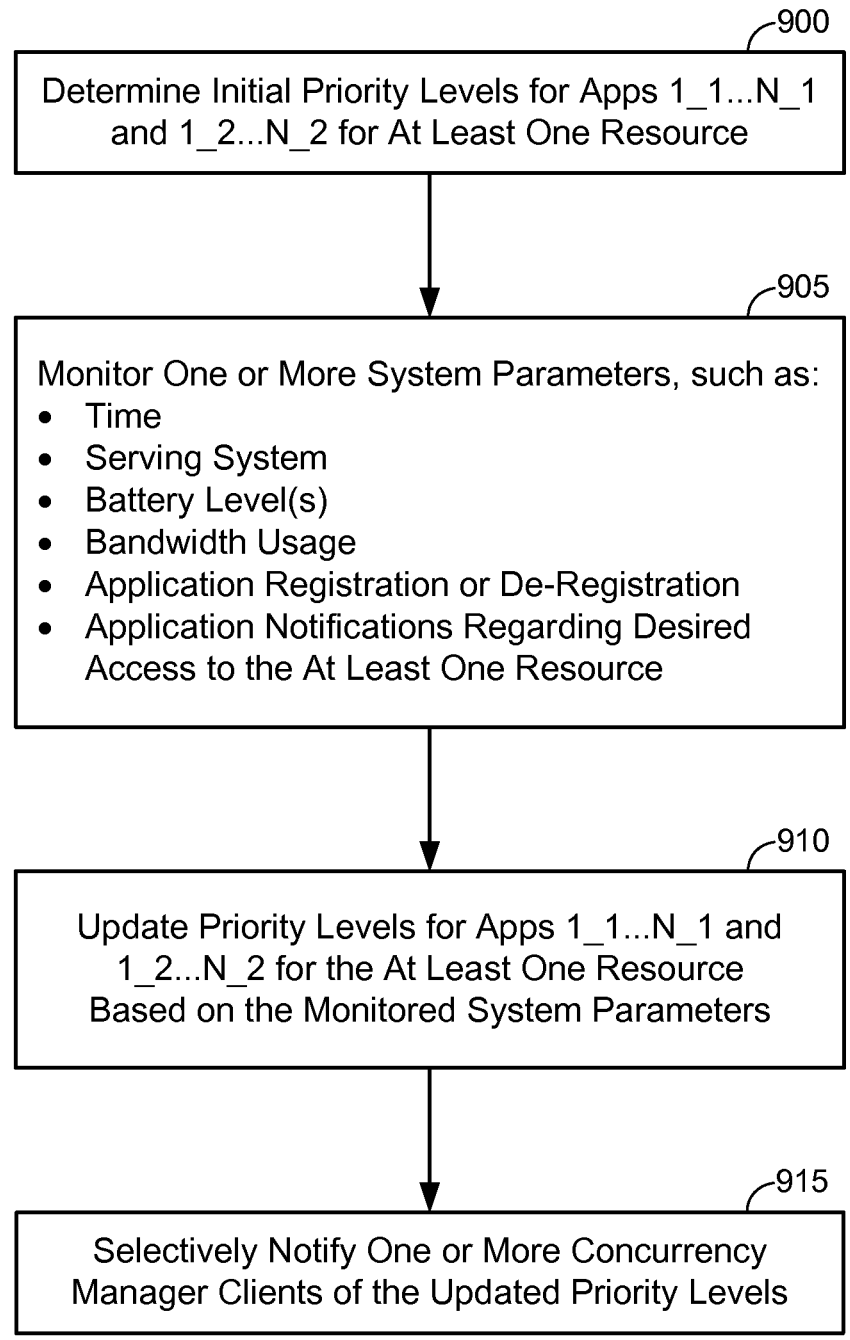
FIG. 9 is an illustration of at least one determination of application priorities in accordance with embodiments of the invention.

FIG. 9 illustrates a procedure by which the concurrency manager server 410B dynamically updates priority levels associated with one or more of applications 1_1 . . . N_1 and/or 1_2 . . . M_2 with respect to at least one resource in accordance with an embodiment of the invention. Referring to FIG. 9, the concurrency manager server 410B determines initial priority levels for one or more of applications 1_1 . . . N_1 and/or 1_2 . . . M_2 with respect to the at least one resource, 900. In an example, 900 of FIG. 9 can correspond to "Determine Initial Priority Levels" (e.g., 500A) of the foregoing FIG. 5A to FIG. 8. Additionally, the decision to allocate the resource to an application can also take into account the predictive duration of usage by that application. For example, a user may be placing a voice call and the call has not yet been established, at the time a PTT call comes in, the PTT calls may only last for a few seconds. So the concurrency manager may decide to grant the resource to the PTT call till the point voice call is successfully established. Another case is when the PTT call is active and voice call comes in, the concurrency manager, instead of tearing down the PTT call immediately, may decide to pause it until the user decides to reject or accept the call. If the user chooses to reject the voice call, then the PTT call may continue, else it should be torn down.

The concurrency manager server 410B also one or more monitors system parameters, 905. For example, the system parameters monitored in 905 can include Time, Serving System, Battery Level(s), Bandwidth Usage, Application Registration or De-Registration, and/or Application Notifications Regarding Desired Access to the At Least One Resource. For example, the monitoring of 905 can be based on polling messages sent to one or more of applications 1_1 . . . N_1 and/or 1_2 . . . M_2, reports sent by one or more of applications 1_1 . . . N_1 and/or 1_2 . . . M_2 to the concurrency manager server 410B and/or based on queries sent by the concurrency manager server 410B to the HLOS or first OS 405B.

In 910, the concurrency manager server 410B selectively updates the priority levels for one or more of applications 1_1 . . . N_1 and 1_2 . . . N_2 for the at least one resource based on the monitored system parameters. For example, with respect to the time parameter, the concurrency manager server 410B can re-calculate or adjust the priority levels for one or more of applications 1_1 . . . N_1 and/or 1_2 . . . M_2 with respect to the at least one resource based on a current time. In another example, with respect to the serving system parameter, the concurrency manager server 410B can re-calculate or adjust the priority levels for one or more of applications 1_1 . . . N_1 and/or 1_2 . . . M_2 with respect to the at least one resource based on whether a serving system has changed (e.g., such that priority levels are at least partially serving system-specific).

Referring to 910 of FIG. 9, in another example, with respect to the battery threshold parameter(s), the concurrency manager server 410B can re-calculate or adjust the priority levels for one or more of applications 1_1 . . . N_1 and/or 1_2 . . . M_2 with respect to the at least one resource based on battery level(s) of battery 465A and/or 415A. For example, if battery levels of battery 465A and/or 415A are relatively low or below a threshold, battery intensive applications among applications 1_1 . . . N_1 and/or 1_2 . . . M_2 can have their respective priorities lowered. Alternatively, in another example, if battery levels of battery 465A and/or 415A rise back above the threshold (e.g., during charging), battery intensive applications among applications 1_1 . . . N_1 and/or 1_2 . . . M_2 can have their respective higher priorities restored.

Referring to 910 of FIG. 9, in another example, with respect to the registration parameter, the concurrency manager server 410B can re-calculate or adjust the priority levels for one or more of applications 1_1 . . . N_1 and/or 1_2 . . . M_2 with respect to the at least one resource when a new application registers with the concurrency manager server 410B for the at least one resource, or alternatively when a previously registered application de-registers from the at least one resource with the concurrency manager server 410B.

After the priority levels are updated in 910 of FIG. 9, the concurrency manager server 410B selectively notifies one or more of the concurrency manager clients (e.g., 420B) of the updated priority levels, in 915. Accordingly, the priority levels that are distributed in each of FIGS. 5A through 8 need not be static, and instead can change in a time-based or event-based manner as described above.

Figure 10:
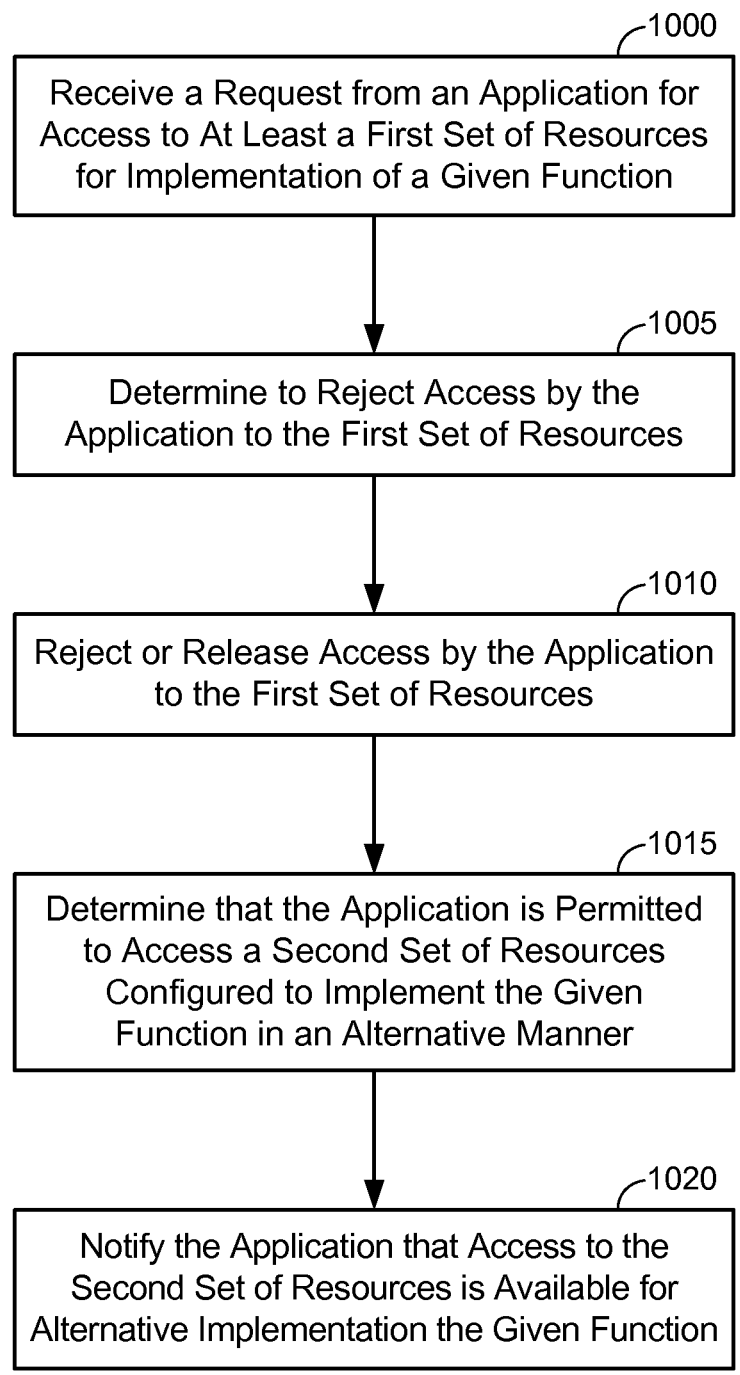
FIG. 10 is directed to a process of rejecting an application's access to a first set of resources while also notifying the application of an availability of a second set of resources in accordance with an embodiment of the invention.
Figure 11:
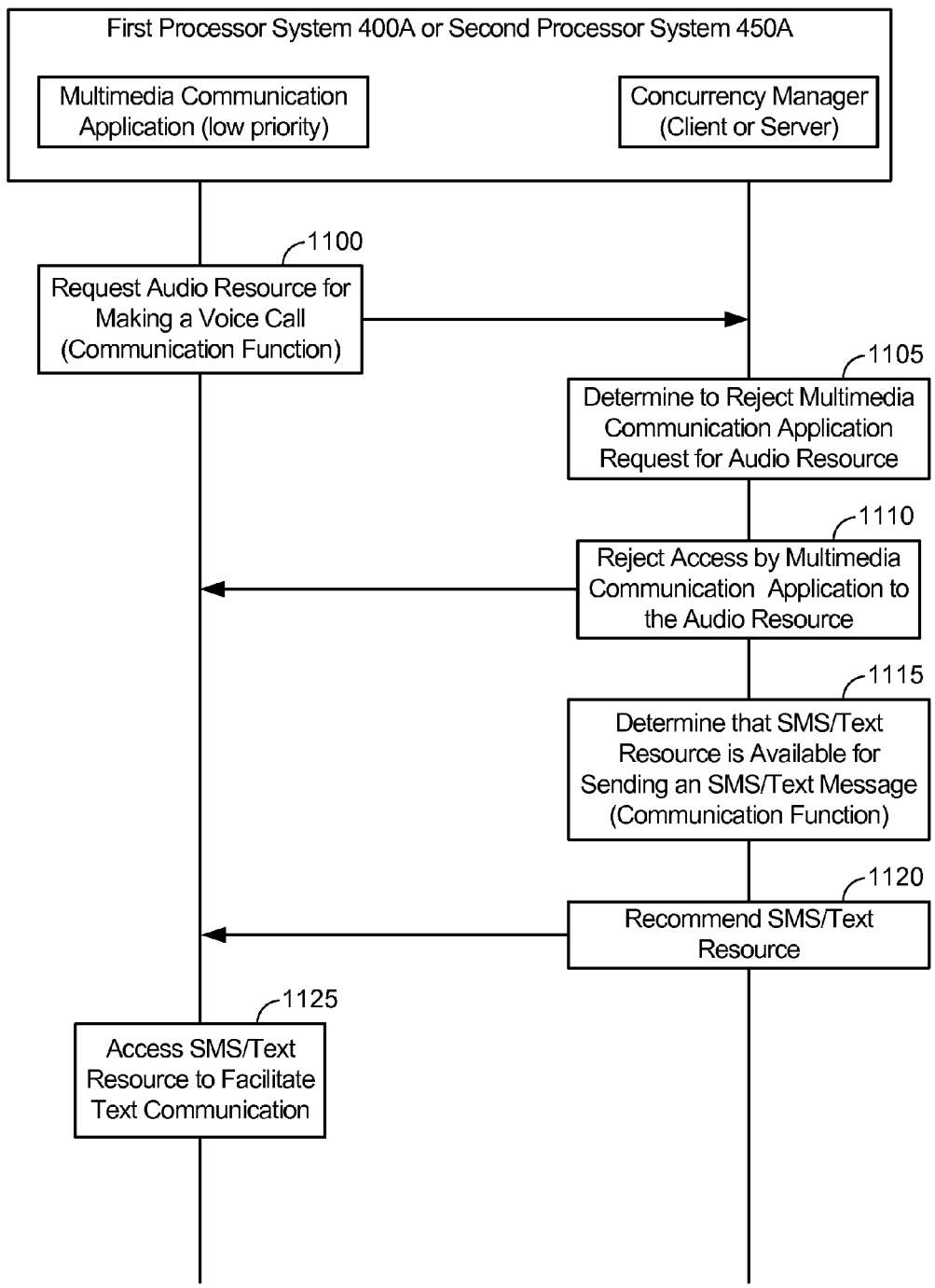
FIG. 11 is directed to an example implementation of the process of FIG. 10 in accordance with an embodiment of the invention.
Figure 12:
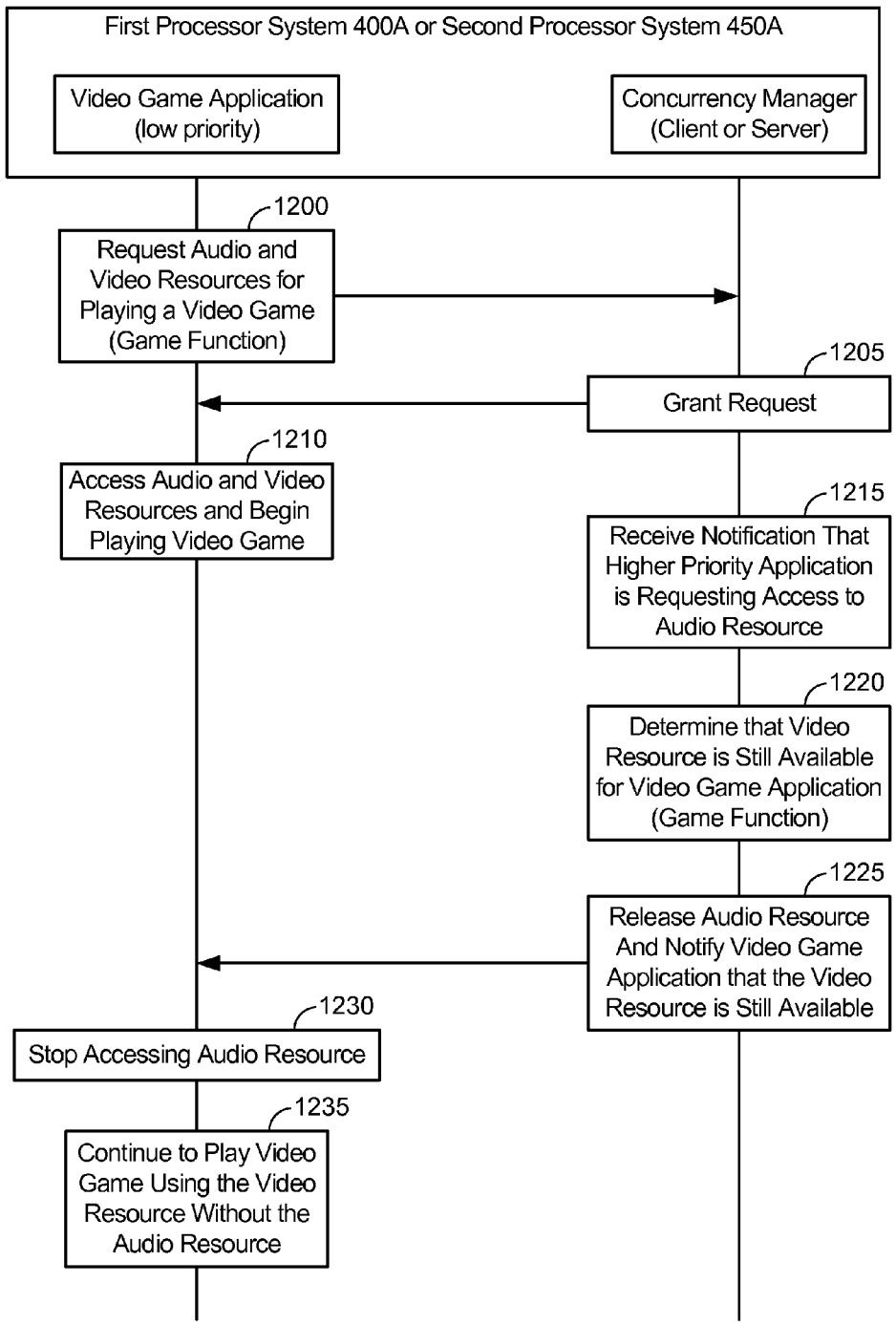
FIG. 12 is directed to an example implementation of the process of FIG. 10 in accordance with another embodiment of the invention.

While the embodiments described above with respect to FIGS. 4A through 9 focus upon how to manage contention for resources between applications on the same or different processing systems of a multi-processor mobile communications device, FIGS. 10 through 12 are directed to procedures that are implemented on behavior of applications that have some or all of their resources rejected.

Accordingly, FIG. 10 is directed to a process of rejecting an application's access to a first set of resources while also notifying the application of an availability of a second set of resources in accordance with an embodiment of the invention. In an example, the second set of resources in FIG. 10 can be sufficient for the application to achieve, in an alternative manner (e.g., a reduced or non-preferred manner), a goal (or function) that prompted the application to request the first set of resources.

Referring to FIG. 10, in an example, the process of FIG. 10 can be executed by the concurrency manager server 410B on the first processor system 400A or the concurrency manager client 420B on the second processor system 450A. Accordingly, the process of FIG. 10 is described as executed by a "resource manager", which can read on the concurrency manager server 410B on the first processor system 400A or the concurrency manager client 420B on the second processor system 450A.

Referring to FIG. 10, the resource manager receives a request from an application for access to at least a first set of resources for implementation of a given function, 1000. In an example whereby the resource manager corresponds to the concurrency manager server 410B on the first processor system 400A, the request of 1000 may correspond to 510A of FIG. 5A, and so on. In an example whereby the resource manager corresponds to the concurrency manager client 420B on the first processor system 450A, the request of 1000 may correspond to 535A of FIG. 5A, and so on. The first set of resources can correspond to any combination of resources requested by the application to implement the given function, such as audio only, video only, audio and video, audio and modem, video and touchscreen display, and so on. In 1000, the given function relates to a resource-independent or high-level objective associated with the application's request for access to the first set of resources. For example, if the application is a Voice over Internet Protocol (VoIP) application requesting audio and modem resources for making a VoIP call, the given function is a communication function for contacting a call target.

Referring to FIG. 10, the resource manager determines to reject the application's access to the first set of resources, 1005, and the first set of resources is then rejected (block or released from) the application, 1010. The rejection of 1005 and 1010 can correspond to a rejection of the request from 1000, in an example, similar to 740 and 745 of FIG. 7 and/or 840 and 845 of FIG. 8. Alternatively, the rejection of 1005 and 1010 can occur after an earlier grant of the request from 1000, similar to 550A and 550A of FIG. 5A and/or 650 and 655 of FIG. 6.

Referring to FIG. 10, the resource manager determines a second set of resources that is available for access by the application and is configured to permit the application to achieve an alternative implementation of the given function, 1015. The resource manager may then notify the application that access to the second set of resources is available for an alternative implementation of the given function, 1020.

For example, the request of 1000 may request a first set of resources (e.g., audio resources) and also a second set of resources (e.g., video and modem resources) for a communication function of a videoconference call. In this case, the resource manager may block or reject the application from accessing the audio resource but may permit the application to access the video and modem resources in 1015 and 1020. Thus, the application can choose whether to participate in the videoconference without audio in this scenario based on the notification from 1020. Alternatively, the request of 1000 may request a first set of resources (e.g., audio resources) to initiate a communication function of contacting a call target via a voice call. If the audio resource is not available, the resource manager may detect that the communication function of contacting the call target can alternatively be achieved via SMS/text resources (e.g., modem resources) at 1010, and then recommend the SMS/text communication in lieu of the voice call. These examples will be described in more detail below with respect to FIGS. 11 and 12.

FIGS. 11 and 12 are directed to example implementations of the process of FIG. 10 in accordance with embodiments of the invention. FIGS. 11 and 12 are described as performed at either the concurrency manager server 410B of the first processor system 400A or the concurrency manager client 420B of the second processor system 450A.

Referring to FIG. 11, a low-priority multimedia communication application determines to access an audio resource for initiating a voice call with a call target, and the multimedia communication application informs its concurrency manager (client or server) of its request to access the audio resource, 1100 (e.g., as in 1000 of FIG. 10). In FIG. 11, assume that the concurrency manager determines to reject the multimedia communication application's request to access the audio resource, 1105 (e.g., similar 1005 of FIG. 10), and the concurrency manager notifies the multimedia communication application of the audio resource access rejection, 1110 (e.g., similar to 1010 of FIG. 10).

At 1115, the concurrency manager determines that resources associated with simple message service (SMS) or texting are available for facilitating the communication function of contacting the call target (albeit, not with a voice call) (e.g., similar to 1015 of FIG. 10). For example, the concurrency manager may be configured with decision logic that includes a list of acceptable alternatives to certain resources when requested by certain applications, such as SMS/text being a non-preferred but acceptable alternative to a voice call. The concurrency manager then notifies the application of the SMS/text resource availability in order to recommend that the multimedia communication application attempt to contact the call target via an alternative mechanism to the desired voice call, 1120 (e.g., similar to 1020 of FIG. 10). The multimedia communication application receives the notification from 1120 and then attempts to access the SMS/text resource to facilitate text communication instead of a voice call, 1125. Accordingly, FIG. 11 shows that resource rejection (e.g., request denial or transfer) need not result in termination of a higher-level function associated with the rejected resource so long as other resources are accessible and can be used as an alternative to the rejected resource.

Referring to FIG. 12, a low-priority video game application determines to access both audio and video resources for initiating a voice call with a call target, and the video game application informs its concurrency manager (client or server) of its request to access the audio and video resources, 1200 (e.g., as in 1000 of FIG. 10, where the audio resource corresponds to the first set of resources). In FIG. 12, assume that the concurrency manager determines to grant the video game application's request to access both the audio and video resources, 1205, and the video game application begins to access the audio and video resources while playing a video game, 1210. At some later point in time, the concurrency manager determines that a higher priority application is requested access to the audio resource, 1215. For example, the notification received at 1215 may correspond to 545A of FIG. 5A and/or 645 of FIG. 6. As an example, an incoming call may be received with a higher priority than the audio played for the video game. Also, in FIG. 12, the notification received at 1215 results in the determination at 1005 of FIG. 10, whereby the concurrency manager determines to revoke the video game application's access privileges to the audio resource. In 1220, the concurrency manager separately determines that the video resource is still accessible to the video game application, and that the video game application can continue to implement the game function in video-only mode (no audio) (e.g., similar to 1015 of FIG. 10, with the video resource now corresponding to the second set of resources).

Accordingly, the concurrency manager notifies the video game application of the rejection of its prior privilege to access the audio resource (e.g., similar to 1010 of FIG. 10) and also of its maintained privilege to access toe video resource (e.g., similar to 1020 of FIG. 10). The video game application receives the notification from 1225 and stops accessing the audio resource, 1230. Further, based on the notification that the video resource remains available, instead of terminating the video game altogether in response the video game application's loss of the audio resource. Also, while not shown explicitly in FIG. 12, the video game can continue in video-only mode (no audio) even while the audio resource is used in conjunction with another application on the mobile device. For example, the audio resource can be used in conjunction with a modem resource to engage in a voice call which can occur in conjunction with the effectively "muted" video game without audio.

Figure 13:
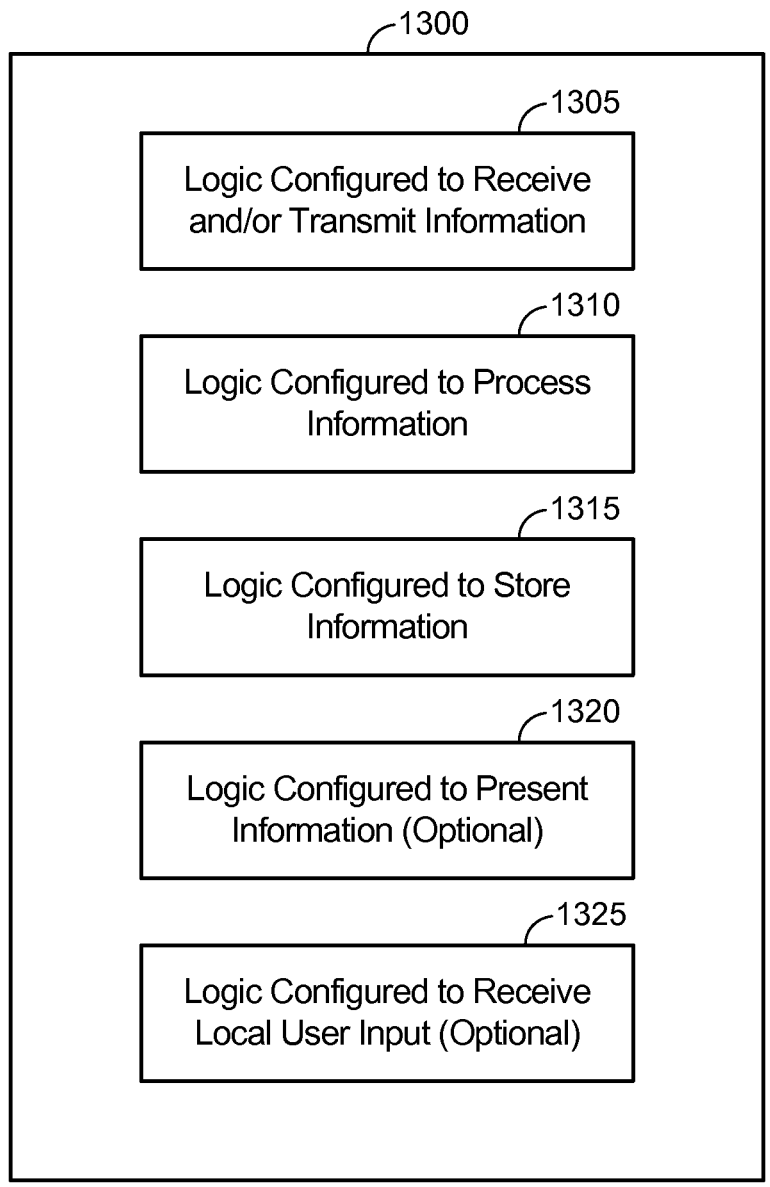
FIG. 13 illustrates a communication device that includes logic configured to perform functionality in accordance with another embodiment of the invention.

FIG. 13 illustrates a communication device 1300 that includes logic configured to perform functionality. The communication device 1300 can correspond to any of the above-noted communication devices, including but not limited to UEs 102, 108, 110, 112 or 200, Node Bs or base stations 124, the RNC or base station controller 122, a packet data network end-point (e.g., SGSN 160, GGSN 165, etc.), any of the servers 170 through 186, etc. Thus, communication device 1300 can correspond to any electronic device that is configured to communicate with (or facilitate communication with) one or more other entities over a network.

Referring to FIG. 13, the communication device 1300 includes logic configured to receive and/or transmit information 1305. In an example, if the communication device 1300 corresponds to a wireless communications device (e.g., UE 200, Node B 124, etc.), the logic configured to receive and/or transmit information 1305 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 1305 can correspond to a wired communications interface (e.g., a serial connection, a USB or Firewire connection, an Ethernet connection through which the Internet 175 can be accessed, etc.). Thus, if the communication device 1300 corresponds to some type of network-based server (e.g., SGSN 160, GGSN 165, application server 170, etc.), the logic configured to receive and/or transmit information 1305 can correspond to an Ethernet card, in an example, that connects the network-based server to other communication entities via an Ethernet protocol. In a further example, the logic configured to receive and/or transmit information 1305 can include sensory or measurement hardware by which the communication device 1300 can monitor its local environment (e.g., an accelerometer, a temperature sensor, a light sensor, an antenna for monitoring local RF signals, etc.). The logic configured to receive and/or transmit information 1305 can also include software that, when executed, permits the associated hardware of the logic configured to receive and/or transmit information 1305 to perform its reception and/or transmission function(s). However, the logic configured to receive and/or transmit information 1305 does not correspond to software alone, and the logic configured to receive and/or transmit information 1305 relies at least in part upon hardware to achieve its functionality.

Referring to FIG. 13, the communication device 1300 further includes logic configured to process information 1310. In an example, the logic configured to process information 1310 can include at least a processor. Example implementations of the type of processing that can be performed by the logic configured to process information 1310 includes but is not limited to performing determinations, establishing connections, making selections between different information options, performing evaluations related to data, interacting with sensors coupled to the communication device 1300 to perform measurement operations, converting information from one format to another (e.g., between different protocols such as .wmv to .avi, etc.), and so on. For example, the processor included in the logic configured to process information 1310 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 1310 can also include software that, when executed, permits the associated hardware of the logic configured to process information 1310 to perform its processing function(s). However, the logic configured to process information 1310 does not correspond to software alone, and the logic configured to process information 1310 relies at least in part upon hardware to achieve its functionality.

Referring to FIG. 13, the communication device 1300 further includes logic configured to store information 1315. In an example, the logic configured to store information 1315 can include at least a non-transitory memory and associated hardware (e.g., a memory controller, etc.). For example, the non-transitory memory included in the logic configured to store information 1315 can correspond to RAM memory, flash memory, ROM memory, EPROM memory, EEPROM memory, registers, hard disk, a removable disk, a CD-ROM, or any other form of storage medium known in the art. The logic configured to store information 1315 can also include software that, when executed, permits the associated hardware of the logic configured to store information 1315 to perform its storage function(s). However, the logic configured to store information 1315 does not correspond to software alone, and the logic configured to store information 1315 relies at least in part upon hardware to achieve its functionality.

Referring to FIG. 13, the communication device 1300 further optionally includes logic configured to present information 1320. In an example, the logic configured to present information 1320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 1300. For example, if the communication device 1300 corresponds to UE 200 as shown in FIG. 3, the logic configured to present information 1320 can include the display 224. In a further example, the logic configured to present information 1320 can be omitted for certain communication devices, such as network communication devices that do not have a local user (e.g., network switches or routers, remote servers, etc.). The logic configured to present information 1320 can also include software that, when executed, permits the associated hardware of the logic configured to present information 1320 to perform its presentation function(s). However, the logic configured to present information 1320 does not correspond to software alone, and the logic configured to present information 1320 relies at least in part upon hardware to achieve its functionality.

Referring to FIG. 13, the communication device 1300 further optionally includes logic configured to receive local user input 1325. In an example, the logic configured to receive local user input 1325 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 1300. For example, if the communication device 1300 corresponds to UE 200 as shown in FIG. 3, the logic configured to receive local user input 1325 can include the display 224 (if implemented a touch-screen), keypad 226, etc. In a further example, the logic configured to receive local user input 1325 can be omitted for certain communication devices, such as network communication devices that do not have a local user (e.g., network switches or routers, remote servers, etc.). The logic configured to receive local user input 1325 can also include software that, when executed, permits the associated hardware of the logic configured to receive local user input 1325 to perform its input reception function(s). However, the logic configured to receive local user input 1325 does not correspond to software alone, and the logic configured to receive local user input 1325 relies at least in part upon hardware to achieve its functionality.

Referring to FIG. 13, while the configured logics of 1305 through 1325 are shown as separate or distinct blocks in FIG. 13, it will be appreciated that the hardware and/or software by which the respective configured logic performs its functionality can overlap in part. For example, any software used to facilitate the functionality of the configured logics of 1305 through 1325 can be stored in the non-transitory memory associated with the logic configured to store information 1315, such that the configured logics of 1305 through 1325 each performs their functionality (i.e., in this case, software execution) based in part upon the operation of software stored by the logic configured to store information 1305. Likewise, hardware that is directly associated with one of the configured logics can be borrowed or used by other configured logics from time to time. For example, the processor of the logic configured to process information 1310 can format data into an appropriate format before being transmitted by the logic configured to receive and/or transmit information 1305, such that the logic configured to receive and/or transmit information 1305 performs its functionality (i.e., in this case, transmission of data) based in part upon the operation of hardware (i.e., the processor) associated with the logic configured to process information 1310. Further, the configured logics or "logic configured to" of 1305 through 1325 are not limited to specific logic gates or elements, but generally refer to the ability to perform the functionality described herein (either via hardware or a combination of hardware and software). Thus, the configured logics or "logic configured to" of 1305 through 1325 are not necessarily implemented as logic gates or logic elements despite sharing the word "logic". Other interactions or cooperation between the configured logics 1305 through 1325 will become clear to one of ordinary skill in the art from a review of the embodiments described above.

While references in the above-described embodiments of the invention have generally used the terms 'call' and 'session' interchangeably, it will be appreciated that any call and/or session is intended to be interpreted as inclusive of actual calls between different parties, or alternatively to data transport sessions that technically may not be considered as 'calls'. Also, while above-embodiments have generally described with respect to PTT sessions, other embodiments can be directed to any type of communication session, such as a push-to-transfer (PTX) session, an emergency VoIP call, etc.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a concurrency manager server application executed by a first operating system on a first processor system of a multi-processor mobile communications device, the concurrency manager server application interacting with a concurrency manager client application executed by a second operating system that is different from the first operating system on a second processor system of the multi-processor mobile communications device, comprising:
   determining priority levels related to access to at least one resource for a first set of applications that execute on the first operating system and a second set of applications that execute on the second operating system, wherein the first and second sets of applications each include a plurality of applications, wherein each resource among the at least one resource is a shared resource that can be accessed by the first and second sets of applications;
   maintaining, by the concurrency manager server application, a master list including a listing of the first and second sets of applications and the determined priority levels;
   notifying, by the concurrency manager server application, the concurrency manager client application of each of the determined priority levels related to access to the at least one resource that are maintained in the master list;
   executing, by the concurrency manager client application, a resource arbitration function by which access to each resource among the at least one resource for applications among the second set of applications is autonomously granted or rejected based on the notified priority levels related to access to the at least one resource and based at least in part upon one or more notifications sent by the concurrency manager server application to the concurrency manager client application indicating whether one or more applications among the first set of applications start and/or stop accessing the at least one resource;
   receiving, by the concurrency manager server application in parallel with the resource arbitration function executed by the concurrency manager client application, a request from a first application from among the first set of applications to access a given resource among the at least one resource; and
   rejecting, by the concurrency manager server application, the request in response to a notification from the concurrency manager client application indicating that a higher priority application among the second set of applications is currently accessing the given resource, or granting, by the concurrency manager server application, the request based on a determination that no higher priority application among either the first or second sets of applications is currently accessing the given resource.

2. The method of claim 1, wherein the granting grants the request, further comprising:
   notifying the concurrency manager client application that the first application has been granted access to the given resource.

3. The method of claim 2, wherein the first application has a first priority level, further comprising:
   receiving, after notifying the concurrency manager client application that the first application has been granted access to the given resource, a given notification from the concurrency manager client application that a second application with a second priority level among the second set of applications is requesting access to the given resource, wherein the second priority level is higher than the first priority level; and
   facilitating the first application to release the given resource responsive to the given notification.

4. The method of claim 2, wherein the first application has a first priority level, further comprising:
   receiving, after notifying the concurrency manager client application that the first application has been granted access to the given resource, a given notification from the concurrency manager client application that a second application with a second priority level among the second set of applications is requesting access to the given resource, wherein the second priority level is lower than the first priority level; and
   after receiving the given notification, determining that the first application is no longer accessing the given resource; and
   responsive to the determination that the first application is no longer accessing the given resource, notifying the concurrency manager client application that the first application is no longer accessing the given resource so that the second application can obtain access to the given resource.

5. The method of claim 1, wherein the rejecting rejects the request, further comprising:
   receiving, after the rejection of the request, a supplemental notification from the concurrency manager client application that the higher priority application is no longer accessing the given resource; and
   transmitting, to the first application, an indication that the first application is now permitted to access the given resource responsive to the received supplemental notification.

6. The method of claim 1, further comprising:
   receiving a given notification from the concurrency manager client application indicating that a lower priority application among the second set of applications is currently accessing the given resource;
   notifying the concurrency manager client application of the request;
   receiving, from the concurrency manager client application, an indication that the lower priority application has released the given resource;
   wherein the granting grants the request in response to the received indication.

7. The method of claim 6, further comprising:
   determining, after the granting, that the first application is no longer accessing the given resource; and
   notifying the concurrency manager client application that the first application is no longer accessing the given resource so that the lower priority application can resume access to the given resource.

8. The method of claim 1,
wherein the at least one resource includes an audio resource,
wherein the first set of applications includes a Voice over Internet Protocol (VoIP) application and the second set of applications includes a circuit switched (CS) voice call application,
wherein the determining determines that the CS voice call application has a higher priority than the VoIP application, and
wherein, responsive to a determination that the VoIP application desires to access the audio resource, the rejecting rejects the VoIP application access to the audio resource responsive to an indication that the CS voice call application has acquired and/or wants to acquire access to the audio resource.

9. The method of claim 1,
wherein the at least one resource includes an audio resource,
wherein the second set of applications includes a Voice over Internet Protocol (VoIP) application and the first set of applications includes a circuit switched (CS) voice call application,
wherein the determining determines that the CS voice call application has a higher priority than the VoIP application, and
wherein, responsive to a determination that the CS voice call application desires to access the audio resource, the granting grants the CS voice call application access to the audio resource irrespective of whether the VoIP application is already accessing the audio resource.

10. The method of claim 1, wherein the first operating system is a High-Level Operating System (HLOS) that is not in direct control of a modem of the multi-processor mobile communications device and the second operating system is a Real-Time Operating System (RTOS) in direct control of the modem of the multi-processor mobile communications device.

11. The method of claim 1, wherein the at least one resource includes a display output device of the multi-processor mobile communications device or a vibration output device of the multi-processor mobile communications device.

12. The method of claim 1, wherein the determining determines the priority levels based at least in part upon at least one battery power level of at least one battery that is configured to provide power to the multi-processor mobile communications device.

13. The method of claim 12,
wherein the at least one battery power level is below a threshold, and
wherein the determining determines a lower priority level for at least one application in the first or second sets of applications while the at least one battery power level is below the threshold relative to when the at least one battery power level is not below the threshold based on the at least one application being classified as a battery-intensive application.

14. A method of operating a concurrency manager client application executed by a second operating system on a second processor system of a multi-processor mobile communications device, the concurrency manager client application interacting with a concurrency manager server application executed by a first operating system that is different from the second operating system on a first processor system of the multi-processor mobile communications device, comprising:

receiving, by the concurrency manager client application from the concurrency manager server application, priority levels related to access to at least one resource for a first set of applications that execute on the first operating system and a second set of applications that execute on the second operating system, wherein the received priority levels correspond to a set of priority levels determined at the concurrency manager server application and maintained at the concurrency manager server application in a master list that includes a listing of the first and second sets of applications and the set of priority levels, wherein the first and second sets of applications each include a plurality of applications, wherein each resource among the at least one resource is a shared resource that can be accessed by the first and second sets of applications;

executing, by the concurrency manager server application, a resource arbitration function by which access to each resource among the at least one resource for applications among the first set of applications is autonomously granted or rejected based on the set of priority levels in the master list and based at least in part upon one or more notifications sent by the concurrency manager client application to the concurrency manager server application indicating whether one or more applications among the second set of applications start and/or stop accessing the at least one resource;

receiving, by the concurrency manager client application in parallel with the resource arbitration function executed by the concurrency manager server application, a request from a first application from among the second set of applications to access a given resource among the at least one resource; and rejecting, by the concurrency manager client application, the request in response to a notification from the concurrency manager server application indicating that a higher priority application among the first set of applications is currently accessing the given resource, or granting, by the concurrency manager client application, the request based on a determination that no higher priority application among either the first or second sets of applications is currently accessing the given resource.

15. The method of claim 14, wherein the granting grants the request, further comprising:
notifying the concurrency manager server application that the first application has been granted access to the given resource.

16. The method of claim 15, wherein the first application has a first priority level, further comprising:
receiving, after notifying the concurrency manager server application that the first application has been granted access to the given resource, a given notification from the concurrency manager server application that a second application with a second priority level among the first set of applications is requesting access to the given resource, wherein the second priority level is higher than the first priority level; and
facilitating the first application to release the given resource responsive to the received notification.

17. The method of claim 15, wherein the first application has a first priority level, further comprising:
receiving, after notifying the concurrency manager server application that the first application has been granted access to the given resource, a given notification from the concurrency manager server application that a second application with a second priority level among the second set of applications is requesting access to the given resource, wherein the second priority level is lower than the first priority level; and after receiving the given notification, determining that the first application is no longer accessing the given resource; and responsive to the determination that the first application is no longer accessing the given resource, notifying the concurrency manager server application that the first application is no longer accessing the given resource so that the second application can obtain access to the given resource.

18. The method of claim 14, wherein the rejecting rejects the request further comprising:

receiving, after the rejection of the request, a supplemental notification from the concurrency manager server application that the higher priority application is no longer accessing the given resource; and transmitting, to the first application, an indication that the first application is now permitted to access the given resource responsive to the received supplemental notification.

19. The method of claim 14, further comprising:

receiving a given notification from the concurrency manager server application indicating that a lower priority application among the first set of applications is currently accessing the given resource;

notifying the concurrency manager server application of the request;

receiving, from the concurrency manager server application, an indication that the lower priority application has released the given resource;

wherein the granting grants the request in response to the received indication.

20. The method of claim 19, further comprising:

determining, after the granting, that the first application is no longer accessing the given resource; and notifying the concurrency manager server application that the first application is no longer accessing the given resource so that the lower priority application can resume access to the given resource.

21. The method of claim 14, wherein the at least one resource includes an audio resource, and wherein the second set of applications includes a Voice over Internet Protocol (VoIP) application and the first set of applications includes a circuit switched (CS) voice call application, further comprising:

determining from the received priority levels that the CS voice call application has a higher priority than the VoIP application, wherein, responsive to a determination that the VoIP application desires to access the audio resource, the rejecting rejects the VoIP application access to the audio resource responsive to an indication that the CS voice call application has acquired and/or wants to acquire access to the audio resource.

22. The method of claim 14, wherein the at least one resource includes an audio resource, and wherein the first set of applications includes a Voice over Internet Protocol (VoIP) application and the second set of applications includes a circuit switched (CS) voice call application, further comprising:

determining from the received priority levels that the CS voice call application has a higher priority than the VoIP application, wherein, responsive to a determination that the CS voice call application desires to access the audio resource, the granting grants the CS voice call application access to the audio resource irrespective of whether the VoIP application is already accessing the audio resource.

23. A multi-processor mobile communications device including a first operating system on a first processor system that executes a concurrency manager server application, the concurrency manager server application configured to interact with a concurrency manager client application executed by a second operating system that is different from the first operating system on a second processor system of the multi-processor mobile communications device, comprising:

logic configured to determine priority levels related to access to at least one resource for a first set of applications that execute on the first operating system and a second set of applications that execute on the second operating system, wherein the first and second sets of applications each include a plurality of applications, wherein each resource among the at least one resource is a shared resource that can be accessed by the first and second sets of applications;

logic configured to maintain a master list including a listing of the first and second sets of applications and the determined priority levels;

logic configured to notify the concurrency manager client application of each of the determined priority levels related to access to the at least one resource that are maintained in the master list;

logic configure to execute, by the concurrency manager client application, a resource arbitration function by which access to each resource among the at least one resource for applications among the second set of applications is autonomously granted or rejected based on the notified priority levels related to access to the at least one resource and based at least in part upon one or more notifications sent by the concurrency manager server application to the concurrency manager client application indicating whether one or more applications among the first set of applications start and/or stop accessing the at least one resource;

logic configured to receive, by the concurrency manager server application in parallel with the resource arbitration function executed by the concurrency manager client application, a request from a first application from among the first set of applications to access a given resource among the at least one resource; and logic configured to reject, by the concurrency manager server application, the request in response to a notification from the concurrency manager client application indicating that a higher priority application among the second set of applications is currently accessing the given resource, or to grant, by the concurrency manager server application, the request based on a determination that no higher priority application among either the first or second sets of applications is currently accessing the given resource.

24. A multi-processor mobile communications device including a second operating system on a second processor system that executes a concurrency manager client application, the concurrency manager client application configured to interact with a concurrency manager server application executed by a first operating system that is different from the second operating system on a first processor system of the multi-processor mobile communications device, comprising:

logic configured to receive, from the concurrency manager server application, priority levels related to access to at least one resource for a first set of applications that execute on the first operating system and a second set of applications that execute on the second operating system, wherein the received priority levels correspond to a set of priority levels determined at the concurrency manager server application and maintained at the concurrency manager server application in a master list that includes a listing of the first and second sets of applications and the set of priority levels, wherein the first and second sets of applications each include a plurality of applications, wherein each resource among the at least one resource is a shared resource that can be accessed by the first and second sets of applications;

logic configured to execute, by the concurrency manager server application, a resource arbitration function by which access to each resource among the at least one resource for applications among the first set of applications is autonomously granted or rejected based on the set of priority levels in the master list and based at least in part upon one or more notifications sent by the concurrency manager client application to the concurrency manager server application indicating whether one or more applications among the second set of applications start and/or stop accessing the at least one resource;

logic configured to receive, by the concurrency manager client application in parallel with the resource arbitration function executed by the concurrency manager server application, a request from a first application from among the second set of applications to access a given resource among the at least one resource; and logic configured to reject, by the concurrency manager client application, the request in response to a notification from the concurrency manager server application indicating that a higher priority application among the first set of applications is currently accessing the given resource, or to grant, by the concurrency manager client application, the request based on a determination that no higher priority application among either the first or second sets of applications is currently accessing the given resource.

25. A non-transitory computer-readable medium containing instructions stored thereon that, when executed by a multi-processor mobile communications device including a first operating system on a first processor system that executes a concurrency manager server application, the concurrency manager server application configured to interact with a concurrency manager client application executed by a second operating system that is different from the first operating system on a second processor system of the multi-processor mobile communications device, cause the multi-processor mobile communications device to perform operations, the instructions comprising:

program code to determine priority levels related to access to at least one resource for a first set of applications that execute on the first operating system and a second set of applications that execute on the second operating system, wherein the first and second sets of applications each include a plurality of applications, wherein each resource among the at least one resource is a shared resource that can be accessed by the first and second sets of applications;

program code to maintain a master list including a listing of the first and second sets of applications and the determined priority levels;

program code to notify the concurrency manager client application of each of the determined priority levels related to access to the at least one resource that are maintained in the master list;

program code to execute, by the concurrency manager client application, a resource arbitration function by which access to each resource among the at least one resource for applications among the second set of applications is autonomously granted or rejected based on the notified priority levels related to access to the at least one resource and based at least in part upon one or more notifications sent by the concurrency manager server application to the concurrency manager client application indicating whether one or more applications among the first set of applications start and/or stop accessing the at least one resource;

program code to receive, by the concurrency manager server application in parallel with the resource arbitration function executed by the concurrency manager client application, a request from a first application from among the first set of applications to access a given resource among the at least one resource; and program code to reject, by the concurrency manager server application, the request in response to a notification from the concurrency manager client application indicating that a higher priority application among the second set of applications is currently accessing the given resource, or to grant, by the concurrency manager server application, the request based on a determination that no higher priority application among either the first or second sets of applications is currently accessing the given resource.

26. A non-transitory computer-readable medium containing instructions stored thereon that, when executed by a multi-processor mobile communications device including a second operating system on a second processor system that executes a concurrency manager client application, the concurrency manager client application configured to interact with a concurrency manager server application executed by a first operating system that is different from the second operating system on a first processor system of the multi-processor mobile communications device, cause the multi-processor mobile communications device to perform operations, the instructions comprising:

program code to receive, from the concurrency manager server application, priority levels related to access to at least one resource for a first set of applications that execute on the first operating system and a second set of applications that execute on the second operating system, wherein the received priority levels correspond to a set of priority levels determined at the concurrency manager server application and maintained at the concurrency manager server application in a master list that includes a listing of the first and second sets of applications and the set of priority levels, wherein the first and second sets of applications each include a plurality of applications, wherein each resource among the at least one resource is a shared resource that can be accessed by the first and second sets of applications;

program code to execute, by the concurrency manager server application, a resource arbitration function by which access to each resource among the at least one resource for applications among the first set of applications is autonomously granted or rejected based on the set of priority levels in the master list and based at least in part upon one or more notifications sent by the concurrency manager client application to the concurrency manager server application indicating whether one or more applications among the second set of applications start and/or stop accessing the at least one resource;

program code to receive, by the concurrency manager client application in parallel with the resource arbitration function executed by the concurrency manager server application, a request from a first application from among the second set of applications to access a given resource among the at least one resource; and program code to reject, by the concurrency manager client application, the request in response to a notification from the concurrency manager server application indicating that a higher priority application among the first set of applications is currently accessing the given resource, or to grant, by the concurrency manager client application, the request based on a determination that no higher priority application among either the first or second sets of applications is currently accessing the given resource.

* * * * *